United States Patent
Feil et al.

(10) Patent No.: US 11,514,679 B1
(45) Date of Patent: Nov. 29, 2022

(54) SMART METHOD FOR NOISE REJECTION IN SPATIAL HUMAN DETECTION SYSTEMS FOR A CLOUD CONNECTED OCCUPANCY SENSING NETWORK

(71) Applicant: Zurn Industries, LLC, Milwaukee, WI (US)

(72) Inventors: Brandon Feil, Milwaukee, WI (US); Arindam Chakraborty, Milwaukee, WI (US)

(73) Assignee: ZURN INDUSTRIES, LLC, Milwaukee, WI (US)

( * ) Notice: Subject to any disclaimer, the term of this patent is extended or adjusted under 35 U.S.C. 154(b) by 0 days.

(21) Appl. No.: 17/651,696

(22) Filed: Feb. 18, 2022

(51) Int. Cl.
*G06V 20/52* (2022.01)
*G01J 5/00* (2022.01)
(Continued)

(52) U.S. Cl.
CPC ............ *G06V 20/52* (2022.01); *G01J 5/0025* (2013.01); *G06T 7/70* (2017.01); *G08B 25/016* (2013.01);
(Continued)

(58) Field of Classification Search
CPC ...... G06V 20/52; G06V 8/20; G06K 9/00771; G01J 2005/0077; G01J 5/0025;
(Continued)

(56) References Cited

U.S. PATENT DOCUMENTS 4,563,780 A  1/1986 Pollack
4,805,247 A  2/1989 Laverty, Jr.
(Continued)

FOREIGN PATENT DOCUMENTS

CN  101702035 A  *  5/2010
CN  112258542 A  *  1/2021
(Continued)

OTHER PUBLICATIONS

J. Jiang et al., "Residential House Occupancy Detection: Trust-Based Scheme Using Economic and Privacy-Aware Sensors," in IEEE Internet of Things Journal, vol. 9, No. 3, pp. 1938-1950, 1 Feb. 1, 2022, doi: 10.1109/JIOT.2021.3091098. (Year: 2022).*
(Continued)

*Primary Examiner* — Michael Robert Cammarata
(74) *Attorney, Agent, or Firm* — Michael Best & Friedrich LLP

(57) ABSTRACT

Systems and methods for detecting or following a person within an observed area. One example system includes a sensor and a processor configured to: receive, from the sensor, a series of readings indicative of the person in the observed area, wherein the observed area is divided into a plurality of zones; determine a sequential occurrence of each of a plurality of ordered events by applying a detection threshold value to the series of readings, wherein the detection threshold value is lower than a noise threshold of the sensor, and wherein each of the plurality of ordered events is associated with at least one of the plurality of zones; and determine a trigger condition based on the sequential occurrence of each of the plurality of ordered events; and provide an instruction to a fixture based on the trigger condition.

26 Claims, 11 Drawing Sheets

(51) Int. Cl.
*G06T 7/70* (2017.01)
*G08B 25/01* (2006.01)

(52) U.S. Cl.
CPC .............. *G01J 2005/0077* (2013.01); *G06T 2207/30242* (2013.01)

(58) Field of Classification Search
CPC ........... G06T 2207/30232; H04N 7/18; G08B 13/189; G08B 13/19663; H01H 2239/07
See application file for complete search history.

(56) References Cited

U.S. PATENT DOCUMENTS

| | | | |
|---|---|---|---|
| 5,217,035 A | 6/1993 | Van Marcke |
| 5,438,714 A | 8/1995 | Shaw |
| 5,612,890 A | 3/1997 | Strasser et al. |
| 5,655,961 A | 8/1997 | Acres et al. |
| 5,838,258 A | 11/1998 | Saar |
| 5,844,808 A | 12/1998 | Konsmo et al. |
| 6,018,827 A | 2/2000 | Shaw et al. |
| 6,038,519 A | 3/2000 | Gauthier et al. |
| 6,189,163 B1 | 2/2001 | Van Marcke |
| 6,236,953 B1 | 5/2001 | Segal |
| 6,337,635 B1 | 1/2002 | Ericksen et al. |
| 6,347,414 B2 | 2/2002 | Contadini et al. |
| 6,411,920 B1 | 6/2002 | McConnell et al. |
| 6,583,720 B1 | 6/2003 | Quigley |
| 6,642,843 B2 | 11/2003 | Satoh |
| 6,694,177 B2 | 2/2004 | Eggers et al. |
| 6,701,194 B2 | 3/2004 | Gauthier et al. |
| 6,749,122 B1 | 6/2004 | Koenck et al. |
| 6,766,221 B1 | 7/2004 | Christiansen |
| 6,769,443 B2 | 8/2004 | Bush |
| 6,956,498 B1 | 10/2005 | Gauthier et al. |
| 6,967,565 B2 | 11/2005 | Lingemann |
| 7,023,341 B2 | 4/2006 | Stilp |
| 7,053,767 B2 | 5/2006 | Petite et al. |
| 7,058,457 B2 | 6/2006 | Kuwahara et al. |
| 7,119,658 B2 | 10/2006 | Stilp |
| 7,143,007 B2 | 11/2006 | Long et al. |
| 7,177,725 B2 | 2/2007 | Nortier et al. |
| 7,222,111 B1 | 5/2007 | Budike, Jr. |
| 7,226,496 B2 | 6/2007 | Ehlers |
| 7,302,313 B2 | 11/2007 | Sharp et al. |
| 7,304,569 B2 | 12/2007 | Marcichow |
| 7,360,413 B2 | 4/2008 | Jeffries et al. |
| 7,755,493 B2 | 7/2010 | Berenguer et al. |
| 7,814,582 B2 | 10/2010 | Reddy et al. |
| 8,028,355 B2 | 10/2011 | Reeder et al. |
| 8,141,296 B2 | 3/2012 | Bem |
| 8,284,018 B2 | 10/2012 | Ibsies |
| 8,364,546 B2 | 1/2013 | Yenni et al. |
| 8,407,821 B2 | 4/2013 | Chan |
| 8,970,391 B2 | 3/2015 | Hoekstra |
| 9,169,625 B2 | 10/2015 | Chiu et al. |
| 9,240,111 B2 | 1/2016 | Scott et al. |
| 9,266,136 B2 | 2/2016 | Klicpera |
| 9,429,453 B1 | 8/2016 | O'Keeffe et al. |
| 9,574,374 B2 | 2/2017 | Klevens et al. |
| 9,659,481 B2 | 5/2017 | Himmelmann et al. |
| 9,830,565 B2 | 11/2017 | O'Toole |
| 9,939,299 B2 | 4/2018 | Patel et al. |
| 9,956,306 B2 | 5/2018 | Brais et al. |
| 9,959,781 B2 | 5/2018 | Roark |
| 9,963,863 B2 | 5/2018 | Allard, III |
| 9,965,938 B1 | 5/2018 | Cronin et al. |
| 10,066,379 B2 | 9/2018 | Schomburg |
| 10,081,968 B2 | 9/2018 | Klevens et al. |
| 10,264,588 B2 | 4/2019 | Wegelin et al. |
| 10,276,018 B2 | 4/2019 | Brillaud |
| 10,329,744 B2 | 6/2019 | Abdel-Fattah et al. |
| 10,361,802 B1 | 7/2019 | Hoffberg-Borghesani et al. |
| 10,430,737 B2 | 10/2019 | Yenni et al. |
| 10,460,582 B2 | 10/2019 | Anderholm et al. |
| 10,485,388 B1 | 11/2019 | McIntosh |
| 10,504,070 B2 | 12/2019 | Jacobson |
| 10,504,355 B2 | 12/2019 | Wegelin et al. |
| 10,514,110 B2 | 12/2019 | Allard, III |
| 10,527,191 B2 | 1/2020 | Bush et al. |
| 10,529,167 B2 | 1/2020 | Khamphilapanyo et al. |
| 10,529,219 B2 | 1/2020 | Herdt et al. |
| 11,108,865 B1 | 8/2021 | Chakraborty et al. |
| 11,153,945 B1* | 10/2021 | Feil ........... H05B 47/13 |
| 11,307,570 B2 | 4/2022 | Trinh et al. |
| 2002/0007510 A1 | 1/2002 | Mann |
| 2002/0053969 A1 | 5/2002 | Wagner et al. |
| 2002/0099454 A1 | 7/2002 | Gerrity |
| 2006/0208862 A1 | 9/2006 | Lahr et al. |
| 2009/0300988 A1 | 12/2009 | Bem |
| 2013/0214166 A1* | 8/2013 | Barlow ............... G01J 5/0025 250/342 |
| 2014/0249854 A1 | 9/2014 | Moore et al. |
| 2014/0379305 A1* | 12/2014 | Kumar .............. H05B 47/13 702/190 |
| 2015/0233146 A1 | 8/2015 | Klevens et al. |
| 2016/0258144 A1 | 9/2016 | Tayenaka et al. |
| 2016/0345406 A1* | 11/2016 | Donhowe ........... H05B 47/11 |
| 2017/0019970 A1 | 1/2017 | Chemel et al. |
| 2017/0038224 A1 | 2/2017 | O'Keeffe et al. |
| 2017/0122005 A1 | 5/2017 | Klevens et al. |
| 2017/0129383 A1 | 5/2017 | Buka et al. |
| 2017/0223807 A1 | 8/2017 | Recker et al. |
| 2017/0358186 A1* | 12/2017 | Harpole .......... G08B 13/19615 |
| 2018/0052055 A1* | 2/2018 | Ikeda .................. G01J 5/34 |
| 2018/0198639 A1 | 7/2018 | Ishizaka |
| 2018/0217292 A1* | 8/2018 | Grosse-Puppendahl ................ G01J 5/12 |
| 2018/0293877 A1 | 10/2018 | Barth |
| 2018/0354777 A1 | 12/2018 | Slater et al. |
| 2019/0001863 A1 | 1/2019 | Taylor |
| 2019/0051214 A1 | 2/2019 | Roark |
| 2019/0351442 A1 | 11/2019 | McNulty et al. |
| 2019/0353278 A1 | 11/2019 | Bush et al. |
| 2019/0354535 A1 | 11/2019 | Amin et al. |
| 2019/0359477 A1 | 11/2019 | Wegelin et al. |
| 2019/0360184 A1 | 11/2019 | Lawinger |
| 2019/0362617 A1 | 11/2019 | Bonner et al. |
| 2019/0387058 A1 | 12/2019 | Heller |
| 2019/0392377 A1 | 12/2019 | Munir et al. |
| 2020/0011005 A1 | 1/2020 | Okumura et al. |
| 2020/0032497 A1 | 1/2020 | Wu |
| 2020/0097030 A1 | 3/2020 | Carlson |
| 2020/0098199 A1 | 3/2020 | Bullock |
| 2020/0099679 A1 | 3/2020 | Carlson |
| 2020/0140254 A1 | 5/2020 | Slater et al. |
| 2020/0141773 A1 | 5/2020 | Burke et al. |
| 2020/0145257 A1 | 5/2020 | Samudrala |
| 2020/0217057 A1 | 7/2020 | Spiro et al. |
| 2020/0232832 A1 | 7/2020 | Burke et al. |
| 2020/0253187 A1 | 8/2020 | Flies et al. |
| 2020/0314866 A1 | 10/2020 | Wegelin et al. |
| 2020/0358852 A1 | 11/2020 | Burke et al. |
| 2020/0404357 A1 | 12/2020 | Kulkarni et al. |
| 2021/0027402 A1 | 1/2021 | Davis et al. |
| 2021/0144210 A1 | 5/2021 | Kohapure et al. |
| 2021/0358293 A1* | 11/2021 | Tournier ................ G08B 13/19 |
| 2022/0020249 A1 | 1/2022 | Castellano |
| 2022/0107632 A1 | 4/2022 | Sinha et al. |

FOREIGN PATENT DOCUMENTS

| | | | |
|---|---|---|---|
| JP | H0357993 A | * | 3/1991 |
| JP | H07284180 A | * | 10/1995 |
| JP | H07311280 A | * | 11/1995 |
| JP | 2002021149 A | | 1/2002 |
| JP | 2002148354 A | * | 5/2002 |
| JP | 2004117250 A | * | 4/2004 |
| JP | 2004258927 A | * | 9/2004 |
| JP | 4443710 B2 | * | 3/2010 |
| JP | 2010216821 A | * | 9/2010 |
| JP | 2019083360 A | * | 5/2019 ....... G08B 13/19617 |
| JP | 2020012303 A | * | 1/2020 |
| JP | 2020051757 A | * | 4/2020 |
| KR | 101137918 B1 | * | 4/2012 |

(56) References Cited

FOREIGN PATENT DOCUMENTS

| | | | |
|---|---|---|---|
| KR | 20220034403 A | * | 3/2022 |
| TW | I727415 B | * | 5/2021 |
| WO | WO1996041058 A1 | | 12/1996 |
| WO | WO2002056540 A2 | | 7/2002 |
| WO | WO-2017113643 A1 | * | 7/2017 ............. F25D 29/00 |

OTHER PUBLICATIONS

Perra C, Kumar A, Losito M, Pirino P, Moradpour M, Gatto G. Monitoring Indoor People Presence in Buildings Using Low-Cost Infrared Sensor Array in Doorways. Sensors (Basel). 2021;21(12):4062. Published Jun. 12, 2021. doi:10.3390/s21124062 (Year: 2021).*

H. Gami, "Movement Direction and Distance Classification Using a Single PIR Sensor," in IEEE Sensors Letters, vol. 2, No. 1, pp. 1-4, Mar. 2018, Art No. 6000104, doi: 10.1109/LSENS.2017.2782179. (Year: 2018).*

Yun, Jaeseok, and Sang-Shin Lee. 2014. "Human Movement Detection and Identification Using Pyroelectric Infrared Sensors" Sensors 14, No. 5: 8057-8081. https://doi.org/10.3390/s140508057 (Year: 2014).*

Shankar, M.; Burchett, J.B.; Hao, Q.; Guenther, B.D.; Brady, D.J. Human-tracking systems using pyroelectric infrared detectors. Opt. Eng. 2006, 45, 106401. (Year: 2006).*

B. Yang, J. Luo, and Q. Liu, "A novel low-cost and small-size human tracking system with pyroelectric infrared sensor mesh network," Infr. Phys. Technol., vol. 63, pp. 147-156, Mar. 2014. (Year: 2014).*

H. Wang, Y. Zhang, Z. Ye, H. Liu, X. Wei and J. Tang, "A Lightweight People Counting Approach for Smart Buildings," 2021 13th International Conference on Wireless Communications and Signal Processing (WCSP), 2021, pp. 1-5, doi: 10.1109/WCSP52459.2021.9613566. (Year: 2021).*

J. Yun and M. -H. Song, "Detecting Direction of Movement Using Pyroelectric Infrared Sensors," in IEEE Sensors Journal, vol. 14, No. 5, pp. 1482-1489, May 2014, doi: 10.1109/JSEN.2013.2296601. (Year: 2014).*

K. Lai, B. Ku and C. Wen, "Using cooperative PIR sensing for human indoor localization," 2018 27th Wireless and Optical Communication Conference (WOCC), 2018, pp. 1-5, doi: 10.1109/WOCC.2018.8372703. (Year: 2018).*

AcuityControls, "nLight Network Lighting Control," Copyright 2014, (78 Pages).

AcuityControls, "SensorView Manual," Nov. 3, 2015, (123 Pages).

Density, "Introducing Density Open Area" website: https://www.density.io/, dated Oct. 8, 2020 (7 Pages).

GE, "Lightsweep Lighing Control System," Product Literature, Dec. 8, 2015, (12 Pages).

Johnson Controls, "Metasys® for Validated Environments (MVE)," Product Bulletin, Dec. 15, 2001, (13 pages).

Lighting Answers, "Controlling Lighting with Building Automation Systems," vol. 4, No. 1, May 1997, <https://www.lightingassociates.org/i/u/2127806/f/tech_sheets/Lighting_Control.pdf>, (8 pages).

Lutron, "Quantum Unlimited Capability for High-Performance Buildings," Product Literature, P/N 367-1321, Apr. 2018, (20 Pages).

Lutron, "What is Lighting Control System", Product Literature 366-396h, Publicly available prior to Nov. 19, 2020, (19 Pages).

Occupancy Lights, Social Distancing Technology, Powerpoint Page, Publicly available at least as early as Nov. 10, 2020.

Tooshlights, "Small upgrade. Big improvement, How it works", Copyright 2021 product brochure, (6 Pages).

Tooshlights, Product website: https://tooshlights.com/products/, Copyright 2021, (11 Pages).

Trane, "Tracer™ SC System Controller for Tracer Building Automated Systems," Product Catalog, P/N BAS-PRC031-EH, Jun. 10, 2013, (27 Pages).

Wiatrowski, "Microprocessor Restroom Robot," Computer Design the Magazine of Digital Electronics, Apr. 1977, pp. 98-100, (3 pages).

* cited by examiner

SMART METHOD FOR NOISE REJECTION IN SPATIAL HUMAN DETECTION SYSTEMS FOR A CLOUD CONNECTED OCCUPANCY SENSING NETWORK

BACKGROUND

Person detection and tracking are tasks of computer systems for locating and following people using, for example, video imagery. These person detection systems employ a range of technologies and methods for detecting the presence of a human body in an area of interest (AOI) and can be used for security authentication, surveillance, and user analytics (e.g., people counters).

SUMMARY

The ability of person detection systems to determine the presence or movement of a person is limited by the output noise of the sensor system. For example, in a system that uses a thermal sensor to detect a person's heat signature, the random output noise of the sensor limits the ability of the system to distinguish a person from the ambient environment. For any given sample, a sensor has an output error due to noise (e.g., plus or minus 0.5 Celsius (C)). Such an output error limits a system's ability to instantaneously determine whether a person is present unless their heat signature exceeds the maximum noise error. If such a system were to apply a threshold to the sensor value that exceeds the noise output (e.g., 0.75 C) the system will reliably detect the heat signature so long as it exceeds the threshold. However, if the threshold is set below the noise threshold (e.g., 0.4 C), the system will be more sensitive, but also less stable as random noise will sometimes exceed the threshold and trigger a false detection.

Accordingly, embodiments of the present disclosure are generally directed to systems for detecting or following a person within an observed area. More particularly, embodiments of the present disclosure are directed to systems for an instruction for a fixture based on a series of readings indicative of the person in an observed area received from a sensor. A trigger condition is determined based sequential occurrence of each of a plurality of ordered events. These events are determined by applying a detection threshold value to the series of readings. The instruction for the fixture is determined base the trigger condition having been met.

Particular embodiments of the subject matter described in this disclosure can be implemented so as to realize one or more of the following advantages. The described person detection systems allow detection threshold values for sensors to be well below the maximum output noise deviation while still preserving system stability by exploiting the ordered nature of human movement. Generally, these systems provide stability but do not depend on filters, which may slow system response; do not require oversampling data that can be applied to sensor systems that have a sensor rate just fast enough to catch valid movement; and do not require careful characterization of noise levels of sensor.

In one aspect, disclosed herein, are person detection systems that include a processor and a computer-readable storage device coupled to the processor. The processor is configured to: receive, from the sensor, a series of readings indicative of a person in the observed area, wherein the observed area is divided into a plurality of zones; determine a sequential occurrence of each of a plurality of ordered events by applying a detection threshold value to the series of readings, wherein the detection threshold value is lower than the noise threshold, and wherein each of the plurality of ordered events is associated with at least one of the plurality of zones; determine a trigger condition based on the sequential occurrence of each of the plurality of ordered events; and provide an instruction to a fixture based on the trigger condition. In some embodiments, the processor is further configured to: determine a control command for the sensor based on the received series of readings indicative of the person in the observed and provide the control command to the sensor. In some embodiments, the events are ordered based on a juxtaposition of each of the associated at least one of the plurality of zones. In some embodiments, the trigger condition is determined based on the sequential occurrence of each of the plurality of ordered events within a configured time allotment. In some embodiments, an initial condition is reset when the configured time allotment is not met. In some embodiments, determining the sequential occurrence of each of the plurality of ordered events includes employing a directional preference to improve noise immunity by preferring previous states when both a forward-going condition and a backward-going condition are met. In some embodiments, the sensor comprises a grid-based infrared sensor. In some embodiments, the series of readings indicative of the person in the observed area includes a heat signature of the person. In some embodiments, the plurality of ordered events includes a rise or a fall of the heat signature within the associated at least one of the plurality of zones. In some embodiments, the sensor comprises a temperature sensor, a passive infrared sensor, an active infrared sensor, a laser sensor, a sonic sensor, a Light Detection and Ranging (LIDAR) sensor, an ultrasound sensor, a pressure sensor, or a proximity sensor. In some embodiments, the sensor is the fixture to which the instruction is provided. In some embodiments, the sensor is embedded within a light fixture. In some embodiments, the sensor and the processor are housed within a single fixture. In some embodiments, the trigger condition includes determining that the person has moved to a particular one of or a group of the plurality of zones. In some embodiments, the trigger condition includes determining that the person has exited the observed area in a particular direction. In some embodiments, the trigger condition includes determining or tracking a movement of the person within the observed area. In some embodiments, the trigger condition includes determining a presence of the person within the observed area. In some embodiments, the trigger condition includes counting the person within the observed area. In some embodiments, the sensor is positioned directly over the observed area. In some embodiments, the sensor is positioned at an angle respective to the observed area. In some embodiments, the series of readings indicative of the person in the observed area are received wirelessly from the sensor. In some embodiments, the series of readings indicative of the person in the observed area are received via wired connection from the sensor. In some embodiments, the instruction is an activation command. In some embodiments, the fixture is a remote indicator or a sign. In some embodiments, the instruction includes triggering an actuator in the fixture. In some embodiments, the instruction includes a change to a state or a behavior of the fixture. In some embodiments, the change to the state includes exiting a low power state. In some embodiments, the processor is further configured to: determine an alert based on the trigger condition and provide the alert to a visual dashboard of a building management solutions (BMS).

In another aspect, disclosed herein, are methods for detecting or following a person within an observed area. The methods are executed by a processor and include: receiving, from a sensor, a series of readings indicative of a person in an observed area, wherein the observed area is divided into a plurality of zones; determining a sequential occurrence of each of a plurality of ordered events by applying a detection threshold value to the series of readings, wherein the detection threshold value is lower than a noise threshold of the sensor, and wherein each of the plurality of ordered events is associated with at least one of the plurality of zones; determining a trigger condition based on the sequential occurrence of each of the plurality of ordered events; and providing an instruction to a fixture based on the trigger condition. In some embodiments, the set of methods is include determining a control command for the sensor based on the received series of readings indicative of the person in the observed; and providing the control command to the sensor. In some embodiments, the events are ordered based on a juxtaposition of each of the associated at least one of the plurality of zones. In some embodiments, the trigger condition is determined based on the sequential occurrence of each of the plurality of ordered events within a configured time allotment. In some embodiments, an initial condition is reset when the configured time allotment is not met. In some embodiments, determining the sequential occurrence of each of the plurality of ordered events includes employing a directional preference to improve noise immunity by preferring previous states when both a forward-going condition and a backward-going condition are met. In some embodiments, the sensor comprises a grid-based infrared sensor. In some embodiments, the series of readings indicative of the person in the observed area includes a heat signature of the person. In some embodiments, the plurality of ordered events includes a rise or a fall of the heat signature within the associated at least one of the plurality of zones. In some embodiments, the sensor comprises a temperature sensor, a passive infrared sensor, an active infrared sensor, a laser sensor, a sonic sensor, a Light Detection and Ranging (LIDAR) sensor, an ultrasound sensor, a pressure sensor, or a proximity sensor. In some embodiments, the sensor is the fixture to which the instruction is provided. In some embodiments, the sensor is embedded within a light fixture. In some embodiments, the sensor and the processor are housed within a single fixture. In some embodiments, the trigger condition includes determining that the person has moved to a particular one of or a group of the plurality of zones. In some embodiments, the trigger condition includes determining that the person has exited the observed area in a particular direction. In some embodiments, the trigger condition includes determining or tracking a movement of the person within the observed area. In some embodiments, the trigger condition includes determining a presence of the person within the observed area. In some embodiments, the trigger condition includes counting the person within the observed area. In some embodiments, the sensor is positioned directly over the observed area. In some embodiments, the sensor is positioned at an angle respective to the observed area. In some embodiments, the series of readings indicative of the person in the observed area are received wirelessly from the sensor. In some embodiments, the series of readings indicative of the person in the observed area are received via wired connection from the sensor. In some embodiments, the instruction is an activation command. In some embodiments, the fixture is a remote indicator or a sign. In some embodiments, the instruction includes triggering an actuator in the fixture. In some embodiments, the instruction includes a change to a state or a behavior of the fixture. In some embodiments, the change to the state includes exiting a low power state. In some embodiments, the methods include determining an alert based on the trigger condition; and providing the alert to a visual dashboard of a BMS.

In another aspect, disclosed herein, are non-transitory, computer-readable mediums storing instructions. These instructions, when executed by an electronic processor, perform a set of operations. The set of operations includes: receiving, from a sensor, a series of readings indicative of a person in an observed area, wherein the observed area is divided into a plurality of zones; determining a sequential occurrence of each of a plurality of ordered events by applying a detection threshold value to the series of readings, wherein the detection threshold value is lower than a noise threshold of the sensor, and wherein each of the plurality of ordered events is associated with at least one of the plurality of zones; determining a trigger condition based on the sequential occurrence of each of the plurality of ordered events; and providing an instruction to a fixture based on the trigger condition. In some embodiments, the set of operations is include determining a control command for the sensor based on the received series of readings indicative of the person in the observed; and providing the control command to the sensor. In some embodiments, the events are ordered based on a juxtaposition of each of the associated at least one of the plurality of zones. In some embodiments, the trigger condition is determined based on the sequential occurrence of each of the plurality of ordered events within a configured time allotment. In some embodiments, an initial condition is reset when the configured time allotment is not met. In some embodiments, determining the sequential occurrence of each of the plurality of ordered events includes employing a directional preference to improve noise immunity by preferring previous states when both a forward-going condition and a backward-going condition are met. In some embodiments, the sensor comprises a grid-based infrared sensor, and wherein the series of readings indicative of the person in the observed area includes a heat signature of the person. In some embodiments, the plurality of ordered events includes a rise or a fall of the heat signature within the associated at least one of the plurality of zones. In some embodiments, the sensor comprises a temperature sensor, a passive infrared sensor, an active infrared sensor, a laser sensor, a sonic sensor, a Light Detection and Ranging (LIDAR) sensor, an ultrasound sensor, a pressure sensor, or a proximity sensor. In some embodiments, the sensor is the fixture to which the instruction is provided. In some embodiments, the sensor is embedded within a light fixture. In some embodiments, the sensor and the processor are housed within a single fixture. In some embodiments, the trigger condition includes determining that the person has moved to a particular one of or a group of the plurality of zones. In some embodiments, the trigger condition includes determining that the person has exited the observed area in a particular direction. In some embodiments, the trigger condition includes determining or tracking a movement of the person within the observed area. In some embodiments, the trigger condition includes determining a presence of the person within the observed area. In some embodiments, the trigger condition includes counting the person within the observed area. In some embodiments, the sensor is positioned directly over the observed area. In some embodiments, the sensor is positioned at an angle respective to the observed area. In some embodiments, the series of readings indicative of the person in the observed area are received wirelessly from the sensor. In some embodiments, the series of readings indicative of the person in the observed area are received via wired connection from the sensor. In some embodiments, the instruction is an activation command, and wherein the fixture is a remote indicator or a sign. In some embodiments, the instruction includes triggering an actuator in the fixture. In some embodiments, the instruction includes a change to a state or a behavior of the fixture. In some embodiments, the change to the state includes exiting a low power state. In some embodiments, the set of operations include determining an alert based on the trigger condition; and providing the alert to a visual dashboard of a BMS.

It is appreciated that methods in accordance with the present disclosure can include any combination of the aspects and features described herein. That is, methods in accordance with the present disclosure are not limited to the combinations of aspects and features specifically described herein, but also may include any combination of the aspects and features provided.

The details of one or more implementations of the present disclosure are set forth in the accompanying drawings and the description below. Other features and advantages of the present disclosure will be apparent from the description and drawings, and from the claims.

BRIEF DESCRIPTION OF THE DRAWINGS

A better understanding of the features and advantages of the present subject matter will be obtained by reference to the following detailed description that sets forth illustrative embodiments and the accompanying drawings of which.

DETAILED DESCRIPTION

Figure 1:
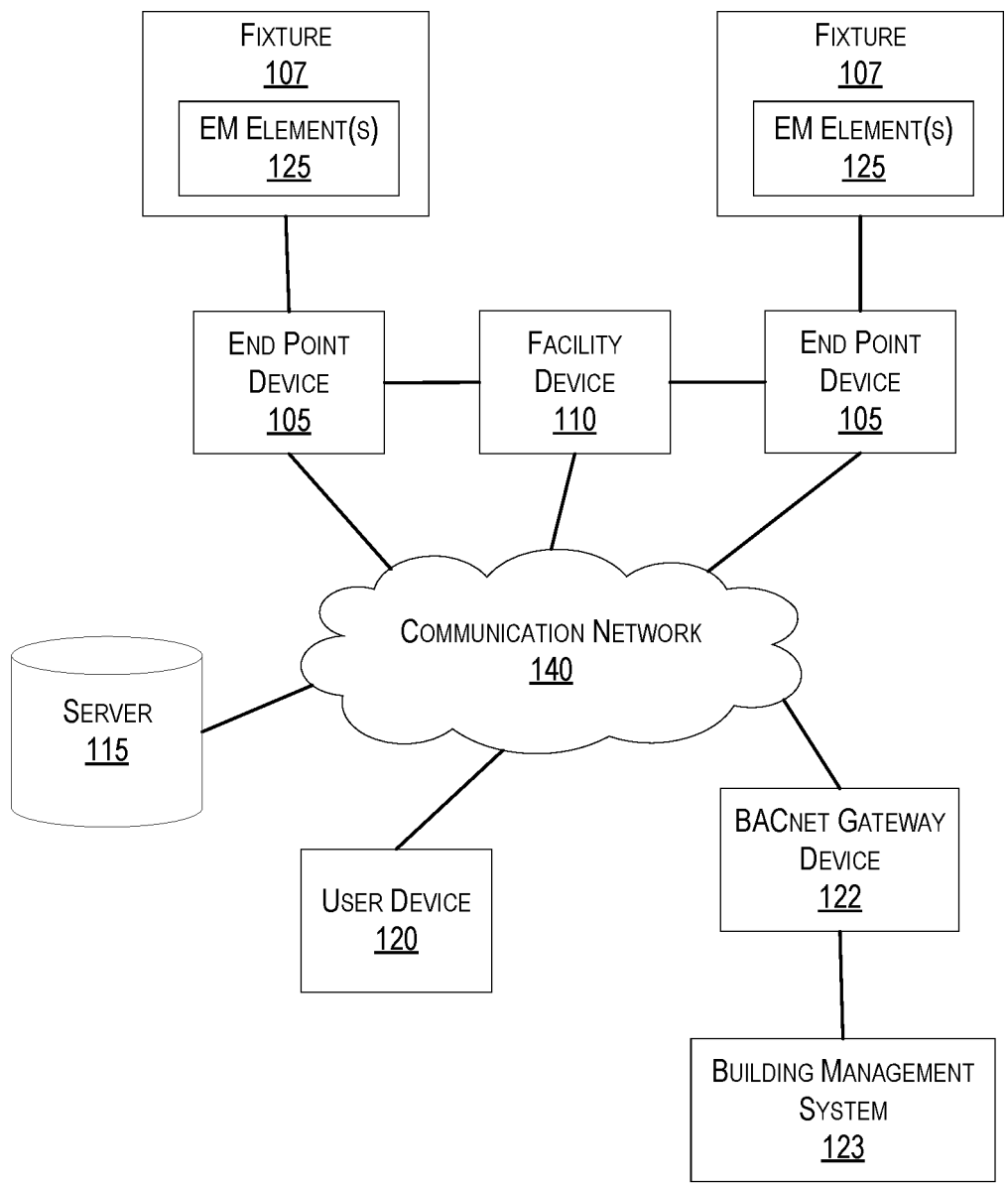
FIG. 1 depicts a non-limiting exemplary embodiment of a system for detecting or following a person within an observed area having a plurality of end point devices that can be employed to execute implementations of the present disclosure.

Before any embodiments of the disclosure are explained in detail, it is to be understood that the disclosure is not limited in its application to the details of embodiment and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical or hydraulic connections or couplings, whether direct or indirect.

It should also be noted that a plurality of hardware and software-based devices, as well as a plurality of different structural components may be used to implement the implementations. In addition, implementations may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one implementation, the electronic based aspects of the disclosure may be implemented in software (for example, stored on non-transitory computer-readable medium) executable by one or more processors. As such, it should be noted that a plurality of hardware and software-based devices, as well as a plurality of different structural components may be utilized to implement various implementations. It should also be understood that although certain drawings illustrate hardware and software located within particular devices, these depictions are for illustrative purposes only. In some implementations, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

Accordingly, described herein, in certain embodiments are person detection systems that include a processor and a computer-readable storage device coupled to the processor. The processor is configured to: receive, from the sensor, a series of readings indicative of a person in the observed area, wherein the observed area is divided into a plurality of zones; determine a sequential occurrence of each of a plurality of ordered events by applying a detection threshold value to the series of readings, wherein the detection threshold value is lower than the noise threshold, and wherein each of the plurality of ordered events is associated with at least one of the plurality of zones; determine a trigger condition based on the sequential occurrence of each of the plurality of ordered events; and provide an instruction to a fixture based on the trigger condition.

Also described herein, in certain embodiments, are methods for detecting or following a person within an observed area. The methods are executed by a processor and include: receiving, from a sensor, a series of readings indicative of a person in an observed area, wherein the observed area is divided into a plurality of zones; determining a sequential occurrence of each of a plurality of ordered events by applying a detection threshold value to the series of readings, wherein the detection threshold value is lower than a noise threshold of the sensor, and wherein each of the plurality of ordered events is associated with at least one of the plurality of zones; determining a trigger condition based on the sequential occurrence of each of the plurality of ordered events; and providing an instruction to a fixture based on the trigger condition.

Also described herein, in certain embodiments, are non-transitory, computer-readable mediums storing instructions. These instructions, when executed by an electronic processor, perform a set of operations. The set of operations includes: receiving, from a sensor, a series of readings indicative of a person in an observed area, wherein the observed area is divided into a plurality of zones; determining a sequential occurrence of each of a plurality of ordered events by applying a detection threshold value to the series of readings, wherein the detection threshold value is lower than a noise threshold of the sensor, and wherein each of the plurality of ordered events is associated with at least one of the plurality of zones; determining a trigger condition based on the sequential occurrence of each of the plurality of ordered events; and providing an instruction to a fixture based on the trigger condition.

Definitions

Unless otherwise defined, all technical terms used herein have the same meaning as commonly understood by one of ordinary skill in the art to which the present subject matter belongs. As used in this specification and the appended claims, the singular forms "a," "an," and "the" include plural references unless the context clearly dictates otherwise. Any reference to "or" herein is intended to encompass "and/or" unless otherwise stated.

As used herein, the term "real-time" refers to transmitting or processing data without intentional delay given the processing limitations of a system, the time required to accurately obtain data and images, and the rate of change of the data and images. In some examples, "real-time" is used to describe the presentation of information obtained from components of embodiments of the present disclosure.

Example System

FIG. 1 depicts an exemplary embodiment of a system 100 that can be employed to execute implementations of the present disclosure. The example system 100 may be employed to, for example, detected or following a person within an observed area. As depicted, the system 100 includes a plurality of endpoint devices 105 (collectively referred to herein as "the endpoint devices 105" and individually as "an endpoint device 105"), a plurality of fixtures 107 (collectively referred to herein as "the fixtures 107" and individually as "a fixture 107"), a facility device 110 (for example, a gateway), a server 115 (for example, cloud server), a user device 120, a BACnet gateway device 122, and a BMS 123. In some embodiments, the system 100 includes fewer, additional, or different components than depicted in FIG. 1. For example, the system 100 may include multiple facility devices 110, servers 115, user devices 120, BACnet gateway devices 122, or a combination thereof. Additionally, the system 100 may include any number of endpoint devices 105 and/or fixtures 107 and the two endpoint devices and fixtures depicted in FIG. 1 are purely for illustrative purposes. In some embodiments, one or more of the components of the system 100 are distributed among multiple devices, combined within a single device, or a combination thereof. As one example, in some embodiments, one or more of the endpoint devices 105 may be incorporated within a fixture 107 as a single device. Accordingly, in some embodiments, the functionality described as being performed by the endpoint device 105 (or a portion thereof) may be performed by a fixture 107 (including built-in or attached similar hardware and software components as the endpoint device 105).

In some embodiments, the endpoint devices 105, the fixtures 107, the facility device 110, the server 115, the user device 120, the BACnet gateway device 122, and the BMS 123 communicate over one or more communication networks 140. Portions of the communication networks 140 may be implemented using a wide area network (WAN), such as the Internet or a LoRa system, a local area network (LAN), such as a Bluetooth™ network or Wi-Fi, and combinations or derivatives thereof. In some embodiments, the communication network 140 includes a telecommunication network or data network. In some embodiments, the communication network 140 can be accessed over a wired or a wireless communications link, such as a network gateway.

In some embodiments, the communication network 140 includes a network of physical objects (or IoT) with mesh and start topological structures (e.g., Narrowband IoT (NBIOT), Long Range (LoRa), ZigBee, general package radio service (GPRS), and Long-Term Evolution (LTE) category M1 (Cat1)). In some embodiments, the physical objects forming the communication network 140 include one or more components of the system 100. In some embodiments, one or more components of the system 100 communicate via LoRa or LoRaWAN networking protocols (for example, the endpoint device 105 and the facility device 110). In some embodiments, protocols can be adopted within the network 210 for specific applications and environments. For example, mesh topology can be used for IOTs of a smaller scale. Moreover, a mesh topology generally supports longer distance data transmission and can be used for IOTs of a larger scale. Using such networking protocols provides for secure, encrypted communication of data without use of a customer or building network. Accordingly, use of such networking protocols may isolate an endpoint device 105 (or other component of the system 100) from a customer or building network.

Accordingly, in some embodiments components of the system 100 can be configured to communicate via Bluetooth, Wi-Fi, Zigbee, LTE/Cellular, wired ethernet, RS485/RS232, or the like. As one example, the endpoint devices 105 may communicate via LoRa with the facility device 110. In some embodiments, one or more components of the system 100 communicate directly as compared to through the communication network 140. For example, the endpoint devices 105 may communicate directly with the facility device 110. Also, in some embodiments, the components of the system 100 communicate through one or more intermediary devices (not shown in FIG. 1).

In some embodiments, the fixture 107 provides a water management solution, a building maintenance solution, a building operation solution, a building management solution, or a combination thereof. Example embodiments of fixture 107 include a faucet, a flushometer, a flush valve, a soap dispenser, a handwashing system, a water service line monitor, a backflow preventer, a floor drain, a hand dryer, a pressure sensor, a water use sensor, a flow sensor, a valve sensor, a lavatory, a toilet, a urinal, a water closet, a bottle and glass filler, a drain (e.g., a sink drain, a roof drain or floor drain network, and the like), a drinking water fountain, an air quality monitor, an air or room quality sensor (e.g., a service request or product replenishment request button or other suitable activator), a backflow preventer, a leak detection sensor, an occupancy detection sensor, a resource dispenser (e.g., a soap dispenser, a sanitizer dispenser, a room deodorizer dispenser, a paper tower dispenser), a fire protection device or fixture (e.g., a smart fire protection device or fixture), a waste receptacle (e.g., a garbage can or bin), a door handle, a thermal mixing valve, a contamination monitor (e.g., a *legionella* contamination sensor), and the like.

As depicted in FIG. 1, each of the fixtures 107 is associated with one or more EM elements 125. In some embodiments, the EM elements 125 are configured to monitor or influence the operation of the fixture 107. Example embodiments of fixture 107 include an EM element 125 include an actuator, a flow sensor, a position sensor, a proximity sensor, a thermocouple, and the like. In some embodiments, the EM elements 125 include an electrical only element, a mechanical only element, or a combination of an electrical and a mechanical element(s). In some embodiments, the EM elements 125 include a single-piece component or multiple components.

As an example, in some embodiments, the fixture 107 is a faucet having a sensor (e.g., as a first EM element 125) configured to detect the presence of a person within (or movement of a person's body part) a specified zone. In some embodiments, when the sensor is triggered (e.g., by detecting the presence of the person), the sensor sends an "ON" signal to an actuator (as a second EM element 125) (e.g., a valve actuating solenoid) thereby allowing water to selectively flow through the faucet. In some embodiments, when the sensor is no longer triggered (e.g., by detecting the absence of a person), the sensor sends an "OFF" signal to the actuator to stop water flow through the faucet. In some embodiments, the actuator is configured to maintain the faucet in an open position for a predetermined period of time in response to receiving an "ON" signal. In some embodiments, the predetermined period of time is set by a user or facility entity via, for example, the facility device 110, the user device 120, another component of the system 100, or a combination thereof.

As another example, in some embodiments, the fixture 107 is a flush valve having a sensor (e.g., as a first EM element 125) configured to detect the presence of a person within a specified zone. In some embodiments, when the sensor is triggered (e.g., by detecting the presence of a person), the sensor sends an "ON" signal to the actuator (as a second EM element 125) (e.g., a valve actuating solenoid) to actuate a valve and initiate a flow of water for a flushing event. In some embodiments, the flush valve remains open for a predetermined period of time (e.g., 5 seconds, 10 seconds, 15 seconds, 20 seconds, 30 seconds, 45 seconds, 1 minute, 2 minutes, 3 minutes, 4 minutes, 5 minutes, and the like) at least partially dependent upon an operating parameter set by the user via, for example, the facility device 110, the user device 120, another component of the system 100, or a combination thereof.

As another example, in some embodiments, the fixture 107 is a resource dispenser (e.g., a soap dispenser or a hand towel dispenser) having a sensor (e.g., as a first EM element 125) configured to detect the presence of a person within a specified zone. In some embodiments, when the sensor is triggered (e.g., by the hands of a person), the sensor sends an "ON" signal to an actuator (e.g., as a second EM element 125) to trigger a resource dispensing event (e.g., actuation of a gear, a valve, or solenoid, and the like to initiate dispensing of a resource). In some embodiments, the resource dispenser is configured to allow a predetermined volume or amount of a resource to be dispensed for each activation. In some embodiments, the volume, amount, or timing of a resource to be dispensed is set and adjusted by the user via, for example, the facility device 110, the user device 120, another component of the system 100, or a combination thereof.

In some embodiments, the resource dispenser includes a second sensor e.g., as a third EM element 125) to monitor the level or amount of resource remaining in a reservoir or receptacle. In some embodiments, the second sensor detects a current level or amount of resource in the reservoir or receptacle at a given moment in time. In some embodiments, the second sensor detects when the resource falls below a predetermined amount or level.

As another example, in some embodiments, the fixture 107 is a water service line monitor. In some embodiments, the water service line monitor includes a sensor (e.g., as a first EM element 125) configured to be retrofit onto an existing water service line and is configured to monitor the flowrate of water therethrough, the presence of a backflow event, or a combination thereof. In some embodiments, the sensor is configured to detect a flow rate, a presence of a backflow event, and the like.

As another example, in some embodiments, the fixture 107 is a contamination monitor. In some embodiments, the contamination monitor includes a sensor (e.g., as a first EM element 125) for detecting contamination of a water supply, such as *legionella* contamination, microorganism contamination, nitrate and nitrite contamination, and the like. Accordingly, in some embodiments, the sensor is configured to detect the existence of a contaminant, a contamination level, or a combination thereof. A contaminant may include, for example, lead, copper, chlorine, arsenic, nitrate, fluoride, mercury, microorganism(s) (e.g., bacteria, viruses, parasites, and the like), and the like. In some embodiments, the sensor is configured to be retrofitted onto an existing water service line (e.g., in a water pipe or at a water valve). As an example, in some embodiments, the sensor is a *legionella* contamination sensor configured to detect the existence of and a contamination level of *legionella* of water in a water service line.

As another example, in some embodiments, the fixture 107 is a thermal mixing valve (e.g., a thermostatic mixing valve) having a first valve (e.g., a first EM element 125) associated with a hot water input, a second valve (e.g., a second EM element 125) associated with cold water input, and at least one valve actuator (e.g., a third EM element 125). In some embodiments, the at least one valve actuator is a mechanism that receives a temperature input or control (e.g., from a user of a faucet associated with the thermal mixing valve). In some embodiments, a valve actuator includes, for example, a faucet handle, a temperature dial, or another type of temperature input mechanism. In some embodiments, when the thermal mixing valve is associated with a faucet and the faucet is "ON" (i.e., water is flowing), a user of the faucet may provide a temperature input or control via the at least one valve actuator. In some embodiments, based on the temperature input or control, the first valve, the second valve, or a combination thereof, are actuated such that the temperature input or control provided by the user is applied to the water flowing through the faucet.

In some embodiments, the thermal temperature valve is associated with a temperature sensor (e.g., a fourth EM element 125) configured to detect and monitor a temperature associated with water flowing through the faucet, a temperature associated with a temperature input or control provided via the valve actuator, or a combination thereof. For example, in some embodiments, the temperature sensor detects a temperature associated with water flowing through the faucet such that the temperature is monitored in comparison to a temperature threshold or range. As an example, in some embodiments, when the temperature detected by the sensor is outside of a temperature range (e.g., too hot, or too cold) a warning or alert is issued. In some embodiments, when the temperature exceeds the temperature range or threshold, the warning or alert indicates a scalding condition where the water flowing through the faucet is too hot. In some embodiments, when the temperature is below the temperature range or threshold, the warning or alert indicates a cold-water condition where the water flowing through the faucet is too cold or a fault with a hot water heater or heating system of a building.

As another example, in some embodiments, the fixture 107 is an air quality monitor having an air quality sensor (e.g., a first EM element 125) configured to detect and monitor an air condition associated with a facility. In some embodiments, the air quality sensor collects data associated with a facility such that the facility is monitored for indoor air pollutants. In some embodiments, an indoor air pollutant includes, for example, carbon monoxide (CO), radon, nitrogen dioxide (NO2), second-hand smoke, lead particles, mold, and the like. In some embodiments, the air quality monitor includes an alert mechanism (e.g., a second EM element 125) that provides or generates an audible alert, a visual alert, another type of alert, or a combination thereof. In some embodiments, the alert mechanism includes, for example, a speaker for generating an audible alert, an LED or other display device for generating a visual alert, and the like.

As another example, in some embodiments, the fixture 107 is a door handle. In some embodiments, the door handle is associated with a door (e.g., a bathroom stall door, a family bathroom door, or a door of a facility as a whole). In some embodiments, the door handle includes a sensor (e.g., a first EM element 125) configured to monitor or detect use of the door associated with the door handle. In some embodiments, the sensor detects an occupancy of a family bathroom by monitoring the opening and closing of the door handle. In some embodiments, the sensor detects an overall use of a specific bathroom stall based on how often the door handle associated with that specific bathroom stall is opened and closed within a predetermined period of time, such as a 24-hour period, an hour period, a week, and the like.

As another example, in some embodiments, the fixture 107 is a fire protection device (e.g., a fire suppression device, a smoke detector, or a sprinkler) having a sensor (e.g., a first EM element 125) configured to monitor an environment for the presence of a fire condition, such as smoke. In some embodiments, when the sensor is triggered (e.g., by detecting the presence of a fire condition), the sensor sends an "ON" signal to the actuator (as a second EM element 125) (e.g., a valve actuating solenoid) to actuate a valve and initiate a release of a fire suppressing agent, such as water. In some embodiments, the valve remains open for a predetermined period of time at least partially dependent upon an operating parameter set by the user via, for example, the facility device 110, the user device 120, another component of the system 100, or a combination thereof. In some embodiments, the valve remains open until receipt of a manual shut off signal (e.g., from a fire fighter) via, for example, the facility device 110, the user device 120, another component of the system 100, or a combination thereof. In some embodiments, the valve remains open until the sensor is no longer triggered (e.g., when the presence of the fire condition is no longer detected). For example, in some embodiments, when the sensor is no longer triggered (e.g., by detecting the absence of a fire condition), the sensor sends an "OFF" signal to the actuator to stop the release of the fire suppressing agent.

In some embodiments, the sensor is configured to detect an operational status of the fire protection device. As an example, in some embodiments, an operational status of the fire protection device is "operational" when the fire protection device is operating as expected or designed. As another example, in some embodiments, an operational status of the fire protection device is "not operational" when the fire protection device is not operating as expected or designed. As another example, in some embodiments, the operational status of the fire protection device is "in need of service" when the fire protection device is in need of service. In some embodiments, the sensor detects or checks the operational status of the fire protection device according to a predetermined schedule, such as every week, every day, every month, and the like.

As another example, in some embodiments, the fixture 107 is a waste receptacle (e.g., a trash or garbage can, a waste disposal container, a sanitary napkin disposal receptacle, a biohazard or medical waste disposal receptacle, and the like) having a sensor (e.g., a first EM element 125) configured to monitor the level or amount of waste in a reservoir or receptacle. In some embodiments, the sensor detects a current level or amount of waste in the container or receptacle. In some embodiments, the sensor is configured to monitor or detect a usage of the waste receptacle (e.g., how many times the waste receptacle is used). As an example, in some embodiments, the sensor is configured to count the number of times a lid of the waste receptacle is opened or triggered to open via, for example, a foot-pedal. As another example, in some embodiments, the sensor is configured to count how many times waste is deposited into the waste receptacle via, for example, motion sensing.

As another example, in some embodiments, the fixture 107 is a drain (e.g., a sink drain, a roof drain, a floor drain, and the like) having a sensor (e.g., a first EM element 125) configured to monitor an amount of water flowing through the drain. In some embodiments, the drain is a sink drain, and the sensor monitors an amount of water flowing through the sink drain such that a usage of a sink associated with the sink drain may be monitored, a run-on condition of a faucet associated with the sink drain may be detected, and the like. In some embodiments, the drain is a floor drain, and the sensor monitors an amount of water flowing through the floor drain such that a usage of a shower stall associated with the floor drain may be monitored, an over-flow condition or leak condition of another fixture (e.g., a facet, or a toilet) is detected, and the like. In some embodiments, the drain is a roof drain, and the sensor monitors an amount of water flowing through the roof drain such that usage of the roof drain is monitored and used to determine, for example, maintenance needs, predict remaining life cycle of the roof drain, and the like. In some embodiments, the sensor monitors a flow rate of water flowing through the roof drain in comparison to other roof drains. For example, in some embodiments, when two roof drains are experiencing a heavy water flow while a third roof drain (proximate to the two roof drains) is experiencing little to no water flow, the third roof drain may be clogged or obstructed (e.g., by leaves or other debris). Accordingly, in some embodiments, the system 100 include a network of fixtures, such as a first fixture, a second fixture, and the like (e.g., a network of roof drains).

As depicted in FIG. 1, in some embodiments, the endpoint device 105 includes a communication link with at least one fixture 107. In some embodiments, the endpoint devices 105 span multiple facilities, locations, rooms, and the like. In some embodiments, each of the endpoint devices 105 is associated with (e.g., located within) the same facility (e.g., a restroom). In some embodiments, the each of the endpoint devices 105 is associated with multiple facilities. As an example, a first endpoint device may be associated with a first facility and a second endpoint device may be associated with a second different facility that is either in the same building as the first facility or in an entirely different building. In some embodiments, each of the endpoint devices 105 is associated with the same type of restroom fixture (e.g., the fixture 107). However, in other embodiments, the each of the endpoint devices 105 is associated with multiple different types of restroom fixtures (e.g., the fixture 107). For example, a first endpoint device may be associated with a faucet (as a first fixture 107) and a second endpoint device may be associated with a soap dispenser (as a second fixture 107).

In some embodiments, data from two or more endpoint devices 105 is combined and processed to gain further insight into the status of respective facility (e.g., a restroom). For example, data from one fixture 107 (e.g., a toilet flush valve) and data from a second fixture 107 (e.g., an overhead occupancy light over the same stall) can be combined and correlated as "stall" data. Such a logical pairing increases the measure of information within the restroom. In some embodiments and continuing with the stall example, the described system processes the combined stall data to determine whether there is a potential issue in the respective stall. The stall data may indicate that the toilet has an issue that is preventing people in the restroom from using the stall. If the system determines, for example, when a person enters a stall and switches an occupancy light (e.g., from green to red) and then determines that the person leaves the stall quickly (e.g., within a short duration such as, for example, 5 seconds) and that the flush valve is not activated within this timeframe, then it becomes clear that there is a reason that the person did not use the toilet. Moreover, a repeated pattern of this type of behavior—short duration visit without a flush—indicates that the stall is in some sort of unusable condition (e.g., clogged toilet, broken/vandalized hardware, unsanitary, no toilet paper, and the like). When such a pattern or condition is detected, the system may, for example, generate and send an alert to a facilities manager, via the BMS 123 (see below), and thus, facilitate the sending of a cleaning/maintenance crew to investigate and remedy by the facilities manager.

To further define the methods being used to detect a stall or toilet in an unusable condition, it is helpful to first understand the sequence of events and interactions during a "normal stall visit. When a user enters a stall that has a connected occupancy light and connected flush valve, an example sequence of events is as follows: 1) the occupancy light 107 starts in an unoccupied (e.g., green) state; 2) the user enters the stall and the occupancy light 107 detects (via an embedded sensor 125) the user's entry; 4) the occupancy light 107 switches to a occupied state (e.g., red) and provides the entry event information to the server 115; 5) a flush valve 107 is activated, 6) the flush 107 valve provides the flush information to the server 115; 7) the user exists the stall and the occupancy light 107 detects (via an embedded sensor 125) the user's exit; and 9) the occupancy light 107 switches back to the unoccupied state (e.g., green) and provides the exit event information to the server 115. When the toilet/stall is in an unusable condition; however, it is reasonable to assume that a user, upon entering the stall, sees the unusable condition, and quickly exits the stall without activating the flush valve. This opens up various ways of to detect such an event. For example, analyzing received data to determine any flush valve actuations were during an occupancy Green-Red-Green sequence ("Abnormal Usage") or any occupancies with a short duration ("Short Duration") (see example section below).

Additionally, the correlation between an occupancy (via the occupancy light) and a flush activation can act as a proxy for the accuracy of the occupancy light. For example, an indication that the occupancy light did not properly detect a user's entry can be determined when a flush occurs without being within a green-red-green cycle of an occupancy light. In some embodiments, a positive or a negative correlation is determined based on the combined end point data to validate a reported detection of someone entering the stall. In a normal usage case (see above), a flush valve actuation occurring during a "red" state would produce a positive correlation meaning that the occupancy detection is correct since someone had to be in the stall in order for the flush activation to occur. If, for some reason, the light detects and reports an occupancy (e.g., goes from green to red), but the stall does NOT report a flush activation during the red state, and the occupancy light turns back to green, then this sequence of events would be determined as a negative correlation because, as assumption is made that if there is no flush, then there was no occupant. There are a few reasonable exception use cases to assumption (e.g., someone going into a stall to change clothes), but for the most part, the expectation is that an occupancy light state transition from green-red-green would expect at least one flush activation.

In some embodiments, abnormal usage is detected based on a pattern of consecutive "occupant detection with no flush" sequences. However, when an occupancy light is functioning improperly, these "occupancy detection with no flush" sequences can be more sporadic and not consecutively. As such, in some embodiments, the described system employs a fixture operations model to determine a potential malfunctioning of the light (e.g., physical misalignment, obscured sensor lens, etc.) as opposed to an "abnormal usage" based on sporadic occurrences of "occupancy detection with no flush" sequences. Furthermore, the reported duration of a "no flush" occupation would likely be longer than the time interval allowed for a "short duration" occurrence. As such, "abnormal usage/short duration" alerts would contribute to a lower accuracy score, but this would be reconciled when a facilities manager investigates the alerts.

Additional insights may also be determined by processing user behavior data from adjacent or nearby stalls. For example, detecting an uptick in usage from neighboring stalls around one that is experiencing short duration events further indicates that the stall in question is in an unusable state. Other types of beneficial insights can be determined based on the types of fixtures 107 employed within the facility (e.g., dispensers, air quality monitors, and the like).

Figure 2:
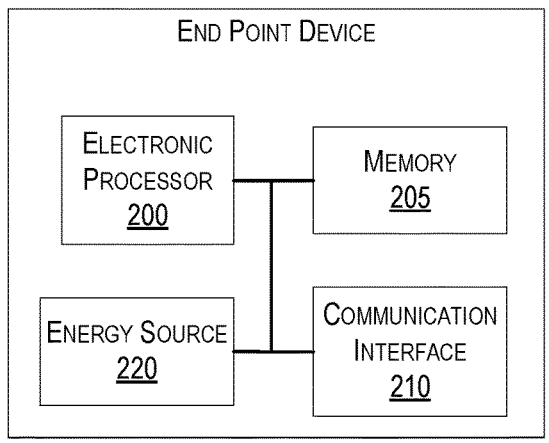
FIG. 2 depicts a non-limiting exemplary embodiment of an end point device.

FIG. 2 depicts an exemplary embodiment of the endpoint device 105. As depicted, the endpoint device 105 includes an electronic processor 200, a memory 205, a communication interface 210, and an energy source 220. In some embodiments, the electronic processor 200, the memory 205, the communication interface 210, and the energy source 220 communicate wirelessly, over one or more communication lines or buses, or a combination thereof. In some embodiments, one or more components of the endpoint device 105 are distributed among multiple devices, integrated into a single device, or a combination thereof. In some embodiments, the endpoint device 105 perform additional functionality other than the functionality described herein. In some embodiments, the endpoint device 105 include additional, different, or fewer components than those illustrated in FIG. 2. As an example, in some embodiments, the endpoint device 105 includes multiple energy sources 220. As another example, in some embodiments, the endpoint device 105 includes one or more expansion ports allowing for future expansion of the endpoint device 105. As such example, additional EM elements of a fixture 107 may be connected to the endpoint device 105 via the one or more of the expansion ports.

In some embodiments, the communication interface 210 allows the endpoint device 105 to communicate with devices external to the endpoint device 105. For example, as depicted in FIG. 1, the endpoint device 105 may communicate with the fixture 107 (or an EM element 125 thereof), the facility device 110, the server 115, the user device 120, the BACnet gateway device 122, the BMS 123, or a combination thereof through the communication interface 210. In some embodiments, the communication interface 210 includes a port for receiving a wired connection to an external device (e.g., a universal serial bus (USB) cable), a transceiver for establishing a wireless connection to an external device (e.g., over one or more communication networks 140, such as the Internet; LAN; a WAN, such as a LoRa network or system, and so forth), or a combination thereof. As an example, in some embodiments, the communication interface 210 includes a port for receiving a wired connection between the facility device 110 and an EM element 125 of a corresponding fixture 107. As another example, in some embodiments, the communication interface 210 includes a radio or transceiver for establishing a wireless connection, over a LoRa system or network, between the endpoint device 105 and the facility device 110.

In some embodiments, the electronic processor 200 includes a microprocessor, an application-specific integrated circuit (ASIC), or a suitable electronic device for processing data. In some embodiments, the memory 205 includes a non-transitory, computer-readable storage medium. In some embodiments, the electronic processor 200 is configured to access and execute computer-readable instructions (software) stored in the memory 205. In some embodiments, the software includes firmware, one or more applications, program data, filters, rules, one or more program modules, and other executable instructions. For example, in some embodiments, the software includes instructions and associated data for performing a set of functions, including the methods described herein. For example, in some embodiments, the electronic processor 200 is configured to enable management or monitoring of the operation of the corresponding fixture 107 either directly or indirectly (e.g., via the EM element(s) 125 of the corresponding fixture 107). In some embodiments, the electronic processor 200 enables management or monitoring of the operation of a corresponding fixture 107 by receiving fixture data from the fixtures 107, converting the fixture data for transmission, and enabling transmission of the converted data to, for example, the facility device 110, the server 115, the user device 120, the BACnet gateway device 122, another component of the system 100, or a combination thereof.

In some embodiments, the electronic processor 200 is configured to interact with and collect data (either directly or indirectly) regarding an operation of a fixture 107 (as fixture data) via the EM elements 215. In some embodiments, the endpoint device 105 is configured to remain in a sleep mode (or deep sleep mode) until an action or operation is detected with respect to a fixture 107 associated with the endpoint device 105 (e.g., detecting the presence of a user). In response to detecting the action or operation, the endpoint device 105 may then wake-up to receive fixture data, convert the fixture data for transmission, and transmit the fixture data (in a minimum power consumption mode) to, for example, the facility device 110, the server 115, the user device 120, another component of the system 100, or a combination thereof. This results in optimized battery life for the product. To further aid in the power optimization, in some embodiments, the transmission of converted fixture data (e.g., as one or more data packets) from the endpoint device 105 to the facility device 110 occurs through an adaptable data rate that automatically selects an available channel.

As depicted in FIG. 2, the endpoint device 105 includes the energy source 220. In some embodiments, the energy source 220 powers one or more components of the endpoint device 105, such as the electronic processor 200. In some embodiments, the energy source 220 is a battery, such as an energy efficient battery, a re-chargeable battery, a lithium-ion battery, a replaceable battery, and the like. As an example, in some embodiments the energy source 220 is a standard battery (e.g., an AAA, AA, C, or D sized batteries). As noted above, in some embodiments, the endpoint device 105 includes multiple energy sources 220 (e.g., a first energy source, a second energy source, and the like). In such embodiments, the multiple energy sources 220 are the same type, different types, or a combination thereof. As an example, in some embodiments, the endpoint device 105 includes three AA batteries as the energy sources 220. In some embodiments, the endpoint device 105 is coupled to and receives power from a power source associated with the facility, the building, another component, and the like.

In some embodiments, one or more components of the system 100 are present in a completed fixture 107 (e.g., a proximity sensor and an actuator in an automated faucet). In such embodiments, additional components may be retrofit onto the existing fixture 107. Accordingly, in some embodiments, the endpoint device 105 (or components thereof) may be retrofit onto or into the existing fixture 107. As an example, in some embodiments, a transmitter, a receiver, a transceiver, or a combination thereof (as part of the communication interface 210), the electronic processor 200, the energy source 220, or a combination thereof are mounted in the plumbing immediately upstream of a particular fixture 107. In other examples, in some embodiments, the retrofit includes updating firmware in the existing device. In still other examples, in some embodiments, the retrofit includes integrating elements into a previously existing fixture 107.

Figure 3:
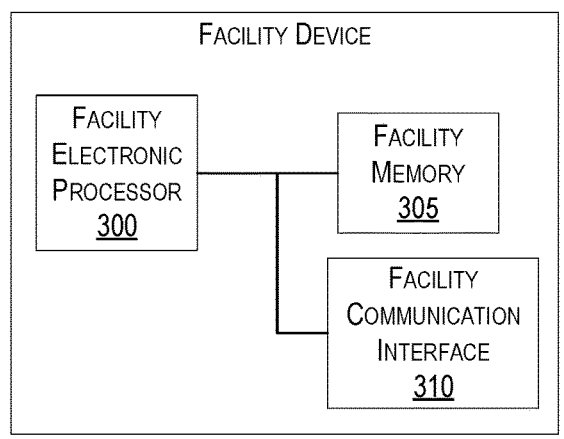
FIG. 3 depicts a non-limiting exemplary embodiment of a facility device.

FIG. 3 depicts an exemplary embodiment of the facility device 110. As depicted, the facility device 110 includes a facility electronic processor 300, a facility memory 305, and a facility communication interface 310. In some embodiments, the facility electronic processor 300, the facility memory 305, and the facility communication interface 310 communicate wirelessly, over one or more communication lines or buses, or a combination thereof. In some embodiments, the facility device 110 includes additional, different, or fewer components than those illustrated in FIG. 3. For example, in some embodiments, the facility device 110 includes a human-machine interface for interacting with a user. In some embodiments, the human machine interface includes one or more input devices, one or more output devices, or a combination thereof. In some embodiments, one or more components of the facility device 110 are distributed among multiple devices, integrated into a single device, or a combination thereof. In some embodiments, the functionality (or a portion thereof) described herein as being performed by the facility device 110 is be distributed among multiple devices.

In some embodiments, the facility device 110 communicates with external devices via the facility communication interface 310. For example, in some embodiments and as illustrated in FIG. 1, the facility device 110 communicates with the endpoint devices 105, the fixtures 107, the server 115, the user device 120, the BACnet gateway device 122, or a combination thereof through the facility communication interface 310. In some embodiments, the facility communication interface 310 includes a port for receiving a wired connection (e.g., a USB cable) to an external device, a transceiver for establishing a wireless connection (e.g., over one or more communication networks 140, such as the Internet; a LAN; or a WAN, such as a LoRa system) to an external device, or a combination thereof.

In some embodiments, the facility electronic processor 300 is configured to access and execute computer-readable instructions ("software") stored in the facility memory 305. In some embodiments, the software includes firmware, one or more applications, program data, filters, rules, one or more program modules, and other executable instructions. For example, in some embodiments, the software includes instructions and associated data for performing a set of functions, including the methods described herein.

In some embodiments, the facility device 110 serves as a gateway or intermediary device that receives data and forwards the data to another component for processing. As an example, in some embodiments, the facility device 110 receives fixture data from the electronic processors 200 of one or more of the endpoint devices 105 and forwards the data to another component for processing, such as the server 115, the user device 120, or a combination thereof. Accordingly, in some embodiments, the facility device 110 forwards the data to a remote server (e.g., the server 115) for virtual processing. As another example, in some embodiments, the facility device 110 receives processed data (e.g., fixture data processed by the server 115) from a remote server (e.g., the server 115) and forwards the processed data to another component, such as the BACnet gateway device 122, for further processing. In such embodiments and as described in greater detail below, data may be converted from LoRa to BACnet. As noted above, in some embodiments, the functionality (or a portion thereof) performed by the facility device 110 may be performed by another remote device or server (not shown).

Returning to FIG. 1, as depicted, the server 115 and the user device 120 are computing devices, such as a desktop computer, a laptop computer, a tablet computer, a terminal, a smart telephone, a smart television, a smart wearable, or another suitable computing device that interfaces with a user. Although not depicted in FIG. 1, in some embodiments, the server 115 and the user device 120 include similar components as the facility device 110, such as an electronic processor (e.g., a microprocessor, an ASIC, or another suitable electronic device), a memory (e.g., a non-transitory, computer-readable storage medium), a communication interface (e.g., a transceiver) for communicating over the communication network 140. In some embodiments, the server 115 and the user device 120 include one or more additional communication networks or connections. In some embodiments, the server 115 and the user device 120 include one or more human machine interfaces.

In some embodiments, the server 115 includes multiple electronic processors, multiple memory modules, multiple communication interfaces, or a combination thereof. In some embodiments, the server 115 is a server-class hardware type device. In some embodiments, the functionality described herein as being performed by the server 115 may be performed in a distributed nature by a plurality of computing devices (or servers) located in various geographic locations. In some embodiments, server 115 includes computer systems using clustered computers and components to act as a single pool of seamless resources when accessed through the network 140. For example, such implementations may be used in data center, cloud computing, storage area network (SAN), and network attached storage (NAS) applications. In some embodiments, the server 115 is deployed using a virtual machine(s). For example, in some embodiments, the functionality described herein as being performed by the server 115 is performed by a plurality of computing devices included in a cloud computing environment.

In the server 115, is coupled to a at least one data store. In some embodiments, the data store is a repository for persistently storing and managing collections of data. Example data store that may be employed such as a database (e.g., lite weight database) as well as simpler store types, such as files, emails, and the like. In some embodiments, the data store includes a database, which may include a series of bytes or an organized collection of data that is managed by a database management system (DBMS). In some embodiments, the data store is provided via a distributed ledger (e.g., a blockchain).

In some embodiments, the server 115 is configured to monitor and manage one or more facilities (e.g., individual restrooms or entire buildings), which includes the fixtures 107 therein. In some embodiments, the server 115 (via an electronic processor of the server 115) receives fixture data from the facility device 110. In response to receiving the fixture data (e.g., operational, or environmental data), in some embodiments, the server 115 processes the fixture data and determines a status for an area associated with the respective fixtures 107 or patterns associated with the area. In some embodiments, the server 115 stores the usage information or patterns in, for example, a data store that uses the memory of the server 115. In some embodiments, the server 115 transmits the usage information or patterns to a remote device for storage.

In some embodiments, access data associated with one or more facilities (e.g., the usage information or patterns determined by the server 115) is provided to users via the user device 120. In some embodiments the user device 120 is employed by an end user (e.g., a facility entity) to monitor and manage a facility (e.g., a single restroom or multiple restrooms in a building), a building, one or more fixtures 107 of a facility or building, or a combination thereof. For example, in some embodiments, a user accesses and interacts with the data determined by the server 115 to view and understand usage patterns, which may provide insights into, for example, how to optimize cleaning and maintenance schedules; whether there is a need for additional facilities, endpoint devices; and the like. For example, in some embodiments, to communicate with the server 115 (e.g., the usage information or patterns determined by the server 115), the user device 120 stores a browser application or a dedicated software application executable by an electronic processor for interacting with the server 115.

In some embodiments, the BMS 123 is a building management or automation system that is associated with a structure (e.g., a building), one or more facilities within the building, or a combination thereof. In some embodiments, the BMS 123 is associated with multiple structures associated with a single location (e.g., an airport campus, a corporation's campus, a university or educational campus, and the like). However, in other embodiments, the BMS 123 is associated with multiple structures associated with related locations. In some embodiments, the BMS 123 is a computer-based control system that is configured to control and monitor, for example, mechanical equipment or electrical equipment, associated with a structure. As an example, in some embodiments, the BMS 123 includes ventilation, lighting, power systems, fire systems, security systems, and the like. In some embodiments, the BMS 123, including the sub-systems included therein, communicate via BACnet communication protocol(s). As noted above, in some embodiments, the BMS 123 is associated with one or more vendors. As an example, in some embodiments, the BMS 123 includes a ventilation system associated with "Vendor A" and a security system associated with "Vendor B." In some embodiments, data associated with the BMS 123 is accessible to a user via a vendor specific dashboard (e.g., a BMS dashboard) that includes a browser application or dedicated software application provided by the respective vendor. In some embodiments, users can leverage the information provided via the BMS 123 to reduce downtime of devices and fixtures and schedule, for example, preventive and proactive maintenance and repair and replacement work.

In some embodiments, a user, via the BMS 123, can schedule operations for a fixture 107. In some embodiments, a user can schedule these operations for various time windows. In some embodiments, an endpoint device 105 that is associated with the designated fixture 107 receives operations from, for example, the BMS 123 or server 115, and schedules execution of the operations by the fixture 107 at the provided execution time(s). For example, in some embodiments, the BMS 123 or server 115 provide an endpoint device 105 operation parameters such as, for example, a start time (e.g., a timestamp that includes a date and time) to execute the operation (e.g., when to begin a purge), a length of time to continue the operation (e.g., how long to continue the purge), and a current time to synchronize an internal clock. In some embodiments, the endpoint device 105 employs an internal RTC to wake up at the appointed time and provide control commands the designated fixture 107 for performing the scheduled operation. For example, in some embodiments, an endpoint device 105 receives an operation for purging a fixture. The operation may include parameters such as, for example, when to begin the purge (e.g., the date and time) and how long to conduct the purge (e.g., a number of seconds). In some embodiments, the endpoint device 105 schedules (e.g., via the memory 205) the operation based on the parameters, and at the schedule time, provides commands to the designated fixture 107 to execute the operation (e.g., a command to turn on followed by a command to turn off after the allot purge time). In some embodiments, the endpoint device 105 provides a completed message along with any other pertinent information (e.g., any error conditions) to the BMS 123 or server 115 after the operation is completed by the designated fixture 107.

In some embodiments, the endpoint devices 105 periodically provide a request for current operations to the facility device 110 or the server 115. In such embodiments, the facility device 110 or the server 115 receive the scheduled operations from the BMS 123 and provide the operations to the designated endpoint devices 105 at the time of execution. In some embodiments, the endpoint devices 105 provide commands to the designated fixtures 107 to execute the operations when the operations are received. In some embodiments, the endpoint devices 105 provide a response to the facility device 110 or the server indicating receipt of an operation.

In some embodiments, when an endpoint device 105 cannot connect to a facility device 110 or the server 115 (e.g., the connection the network 140 is dropped), the endpoint device 105 sends a request for current operations to the facility device 110 or the server 115 once a network connection is reestablished. In some embodiments, the facility device 110 or the server 115 will periodically send an operation to a designated endpoint device 105 until a receipt message is received for the endpoint device 105 (e.g., when the endpoint device has reestablished a connection to the network 140).

In some embodiments, a user can group multiple fixtures 107 and schedule operations for the group. For example, in some embodiments the fixtures 107 are grouped based on usage (e.g., how frequently the device is activated) or location (e.g., in the same room, on the same floor, in the same building, connected to a common water supply, and the like). In some embodiments, the fixtures 105 can be placed in more than one group, and as such, the respective endpoint device(s) 155 is provided the operation for each the assigned groups. In some embodiments, the operations relate to maintenance, operational efficiency, downtime reduction, real-time monitoring, and the like, of the fixtures 107.

In some embodiments, the server 115 processes received fixture data to train (e.g., based on machine learning) a status model for the endpoint devices 105 or the fixtures 107. In some embodiments, the server 115 processes the received fixture data through the integrated, trained status model to determine a status for an area (e.g., a stall). In some embodiments, operation commands for end point devices 105 or fixtures 107 that are associated with the area are determined based on the status. In some embodiments, the operation command is provided to a respective endpoint device 105 or associated fixture 107 via the network 140. For example, in some embodiments, operational data (e.g., flush valve usage) and environmental data (e.g., stall occupancy) are processes through a trained status model to determine a status (e.g., unusable condition) for the area. Operation commands for an end point device or fixture associated with the area are then determined based on the status (e.g., activation of a flush valve).

Figure 4:
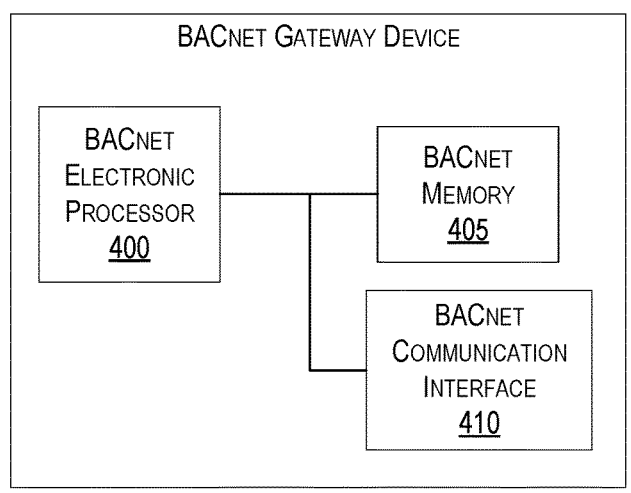
FIG. 4 depicts a non-limiting exemplary embodiment of a BACnet gateway device.

As depicted in FIG. 1, in some embodiments, the BMS 123 communicates with one or more components of the system 100 via the BACnet gateway device 122. The example embodiment of the BACnet gateway device 122 depicted in FIG. 4 includes a BACnet electronic processor 400, a BACnet memory 405, and a BACnet communication interface 410. In some embodiments, the BACnet electronic processor 400, the BACnet memory 405, and the BACnet communication interface 410 communicate wirelessly, over one or more communication lines or buses, or a combination thereof. In some embodiments, the BACnet gateway device 122 includes additional, different, or fewer components than those illustrated in FIG. 4. For example, in some embodiments, the BACnet gateway device 122 includes a human-machine interface for interacting with a user. In some embodiments, the human machine interface includes one or more input devices, one or more output devices, or a combination thereof. In some embodiments, one or more components of the BACnet gateway device 122 are distributed among multiple devices, integrated into a single device, or a combination thereof. In some embodiments, the BACnet gateway device 122 performs additional functionality other than the functionality described herein. In some embodiments, the functionality (or a portion thereof) described herein as being performed by the BACnet gateway device 122 is distributed among multiple devices.

In some embodiments, the BACnet communication interface 410 allows the BACnet gateway device 122 to communicate with devices external to the BACnet gateway device 122. For example, in some embodiments and as depicted in FIG. 1, the BACnet gateway device 122 communicates with the endpoint devices 105, the fixtures 107, the server 115, the user device 120, the BMS 123, or a combination thereof through the BACnet communication interface 410. In some embodiments, the BACnet communication interface 410 includes a port for receiving a wired connection to an external device (e.g., a USB cable and the like), a transceiver for establishing a wireless connection to an external device (e.g., the communication network 140), or a combination thereof.

In some embodiments, the BACnet electronic processor 400 is configured to access and execute computer-readable instructions ("software") stored in the BACnet memory 405. In some embodiments, the software includes firmware, one or more applications, program data, filters, rules, one or more program modules, and other executable instructions. For example, in some embodiments, the software includes instructions and associated data for performing a set of functions, including the methods described herein.

In some embodiments, the BACnet gateway device 122 serves as a gateway or intermediary device that receives data and forwards the data to another component for processing. As an example, in some embodiments, the BACnet gateway device 122 receives processed fixture data (as processed by the server 115) from the facility device 110 and converts the processed fixture data to a communication protocol, such as a BACnet communication protocol, associated with the BMS 123 (e.g., from LoRa to BACnet). In some embodiments, after converting the processed fixture data, the BACnet gateway device 122 forwards the converted fixture data to the BMS 123 (or another component of the system 100). In some embodiments, the BMS 123 enables a user of the BMS 123 to access and interact with the converted fixture data via the BMS dashboard, which may be specific to one or more vendors (as noted above). In some embodiments, the BACnet gateway device 122 receives the processed fixture data from another component of the system 100, such as the server 110 or the user device 120. Accordingly, in some embodiments, the BACnet gateway device 122 receives the processed fixture data directly from the server 110 (post-processing of the fixture data by the server 110).

Figure 5:
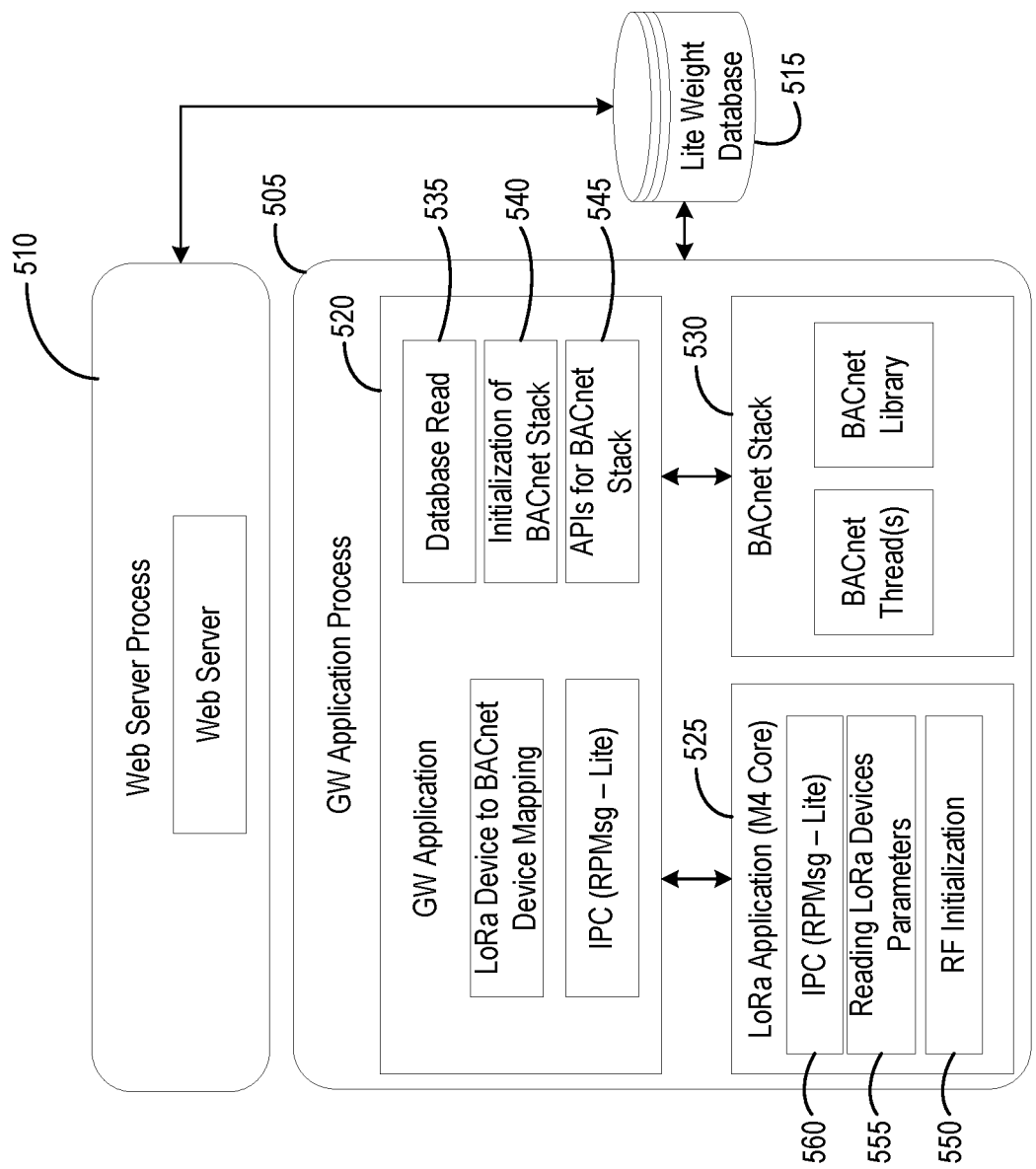
FIG. 5 depicts an architectural diagram of a non-limiting exemplary embodiment of a BACnet gateway device.

FIG. 5 depicts an exemplary embodiment of an architecture for the BACnet gateway device 122. As depicted in FIG. 5, the BACnet gateway device 122 executes or performs a gateway application process (represented by reference numeral 505), a web server application process (represented by reference numeral 510), or a combination thereof, which both access a database 515 (e.g., a lite weight database). In some embodiments, a user interface is provided to a user (e.g., via the user device 120). In some embodiments, the user interface interfaces are employed to set, for example, network parameters, BACnet stack configuration, LoRa to BACnet parameter mapping, and the like. As depicted in FIG. 5, in some embodiments, the gateway application process 505 is divided into three parts: a gateway application 520, a BACnet stack 525, and a LoRa Application 530. In some embodiments, the gateway application 520 reads configuration settings from the database 515 (represented by reference numeral 535), initializes the BACnet stack 530 (represented by reference numeral 540), registers application programming interfaces (APIs) for a LoRa call-back handler (represented by reference numeral 545), updates the BACnet stack 530 with a LoRa device, and the like. In some embodiments, the LoRa application 525 initializes an RF module (represented by reference numeral 550); reads parameters value received from a LoRa gateway, such as the facility device 110 (represented by reference numeral 555); initialize remote processor messaging (RPMsg) communication (represented by reference numeral 560), send LoRa device parameters to the BACnet stack 530, and the like. In some embodiments, the BACnet stack 530 provides the software API(s) to update device parameter values, BACnet services over ethernet, and the like.

Figure 6:
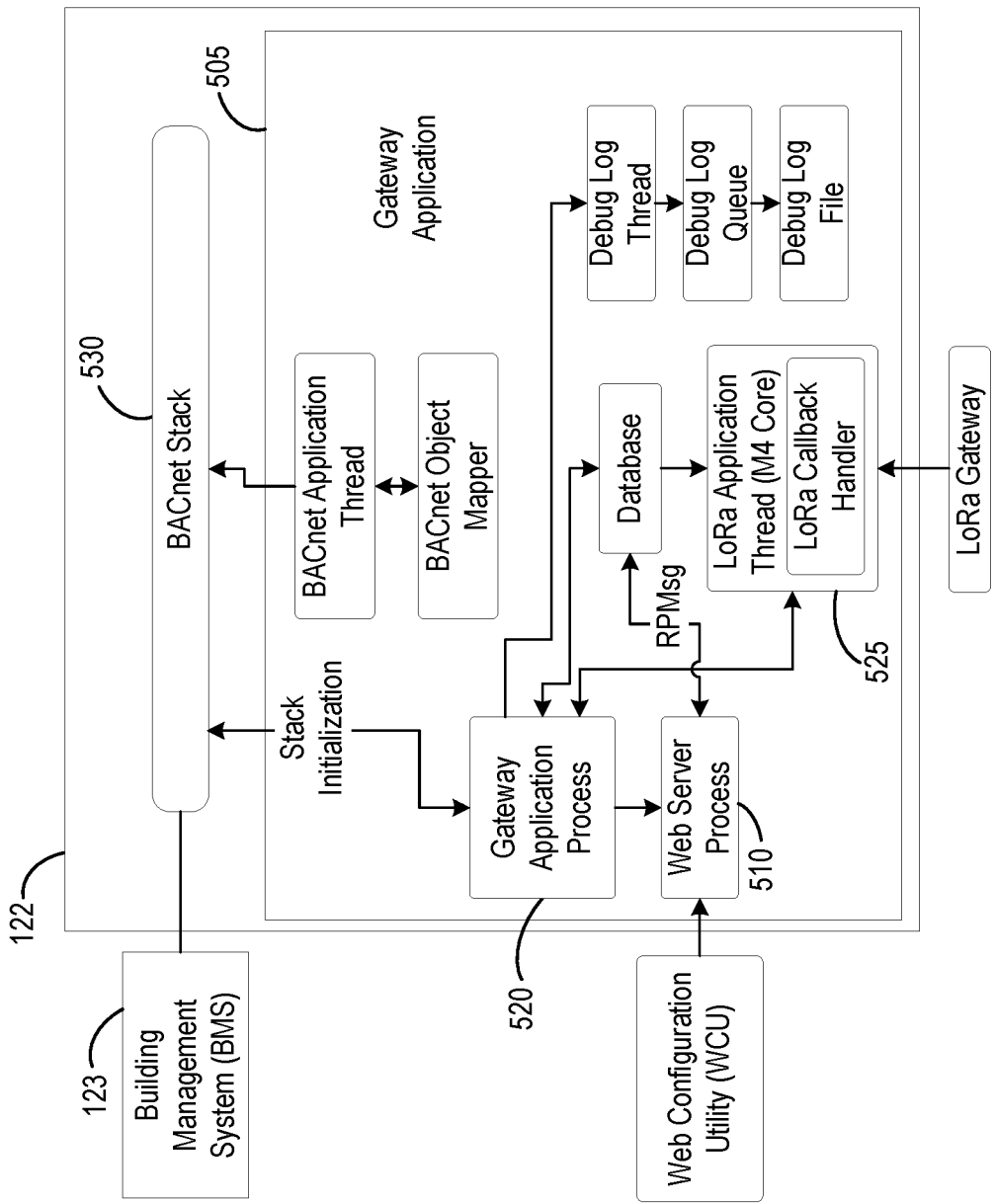
FIG. 6 depicts a flowchart of a non-limiting exemplary embodiment of a gateway application performed by a BACnet gateway device.
Figure 7:
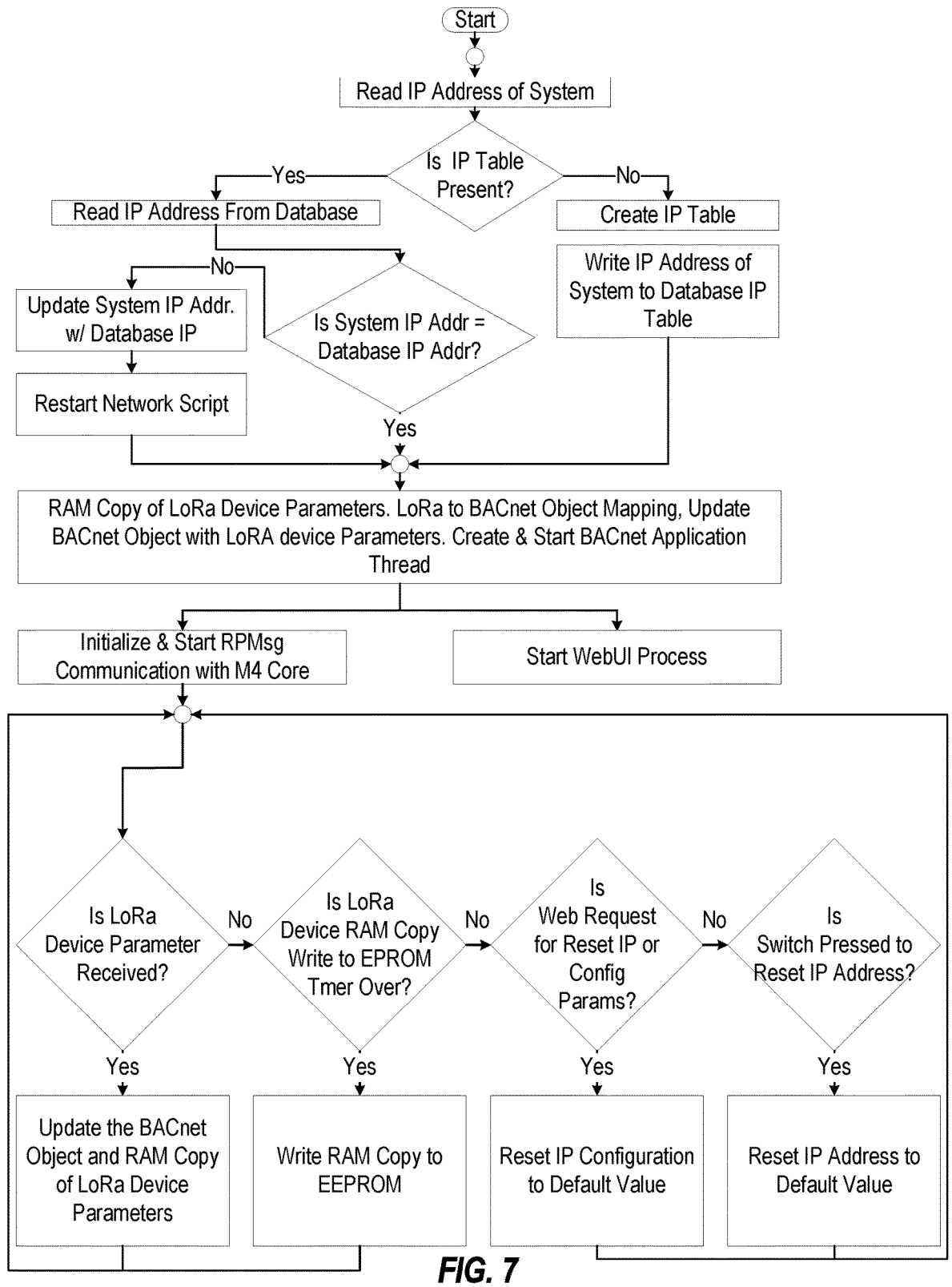
FIG. 7 depicts a flowchart of a non-limiting exemplary embodiment of example functionality performed by a gateway application.

FIG. 6 depicts an exemplary embodiment of an architecture for the gateway application executed by the BACnet gateway device 122. FIG. 7 depicts a flowchart illustrating example functionality performed by the gateway application. In the example illustrated in FIG. 6, the BACnet gateway application includes a gateway application process, a web server process, a BACnet application thread, a LoRa application, and a debug log thread. In some embodiments, the gateway application process is the main process executed by the BACnet gateway device 122 upon power ON. In some embodiments, the gateway application process performs an internet protocol (IP) acquisition function, BACnet stack initialization function (as per the database and EEPROM settings), a create thread function (for handling RPMSg communication, electrically erasable programmable read-only memory (EEPROM) read write operation, hardware switch functionality and RTC functionality), a process function (for the inter process communication (IPC) commands for JavaScript Object Notation (JSON) file, update parameters, delete device, or the like), RPMSg communication with M4 core, EEPROM read and write operations (to store LoRa device parameters present value), reset network settings to default when hardware switch is pressed (including, for example, run time adoption of network and Device Authorization Control (DAC) delete stack settings, syncing real-time communication (RTC) and system time with Network Time Protocol (NTP), and the like). In some embodiments, the web server process performs Hypertext Transfer Protocol (HTTP) client communication, writing parameters into the database, and the like. In some embodiments, BACnet application thread parses the data received over RPMsg channel from M4 and set into the BAC delete stack and the database. In some embodiments, LoRa application runs on cortex—M4 core. In some embodiments, the LoRa application handles LoRa RF communication and IPC using RPMsg framework, send received data to A7, and the like. In some embodiments, the debug log thread receives errors from other modules and creates a debug log file (e.g., when the debug log file creation option is enabled). In some embodiments, the debug log thread generates logs upon errors as well as debug/information logs based on the log level set.

Multiple Ordered Events

In some embodiments, the described person detection system employs a grid representing an observed area or zone of interest to accept or count movement as a person but reject noise. In some embodiments, the described person detection system employs a grid to determine whether multiple ordered events have occurred in a series in order to determine that a person is moving within the observed area. In some embodiments, by segmenting the observed region into zones and looking only at zones of interest rather than trying to pinpoint an exact location, the system can ignore noise in a significant portion of the observed region. Thus, for random noise to trigger an observation, the signature must rise first in the observed zone followed by a rise in a next zone(s) and so forth.

As an example, in an occupancy detection or people counting scenario, described person detection system includes a grid-based infrared sensor that provides information indicative of the observed area that is projected onto a grid, such as described above. In some embodiments, the sensors are embedded within another fixture, such as a light fixture. In some embodiments, the the direction of the sensors (and the light fixture) is configuration. For example, the sensor may be positioned directly above the observed area. In other examples, the sensor can be positioned at an angle respective the observed area (e.g., 0-360 degrees) in order to optimally detect the motion of a person in the proximity of or directly within the observed area.

Generally, in a valid event (a person moving though the observed area as opposed to noise), a person walks from one part of the observed area to another. In one example, the person's movement starts outside the observed area (represented by the grid) and ends either in a particular region within the observed area or by exiting the observed area in a particular direction. In this example, the ability to distinguish a person from the environment is impeded by the output noise of the sensor as each region of the grid is subject to noise that could incorrectly be detected as a person. Rather than looking at the grid as a whole and trying to identify a person within it, in some embodiments, the described person detection system observes the ordered nature of a person walking through the observed area to reject noise in parts of the observed area that are not yet of any interest. The above example and the description of FIGS. 8A-9C below describes employing an infrared sensor to detect a heat signature within the observed area; however, the system can employ a sensor of any type that can be used to detect a person's presence in the observed area with accuracy and precision based on various application environments. Example sensors include temperature, passive infrared, active infrared, laser, sonic, Light Detection and Ranging (LIDAR), ultrasound, pressure, proximity, imaging, cameras, or any other person profile detecting type.

Figure 8A:
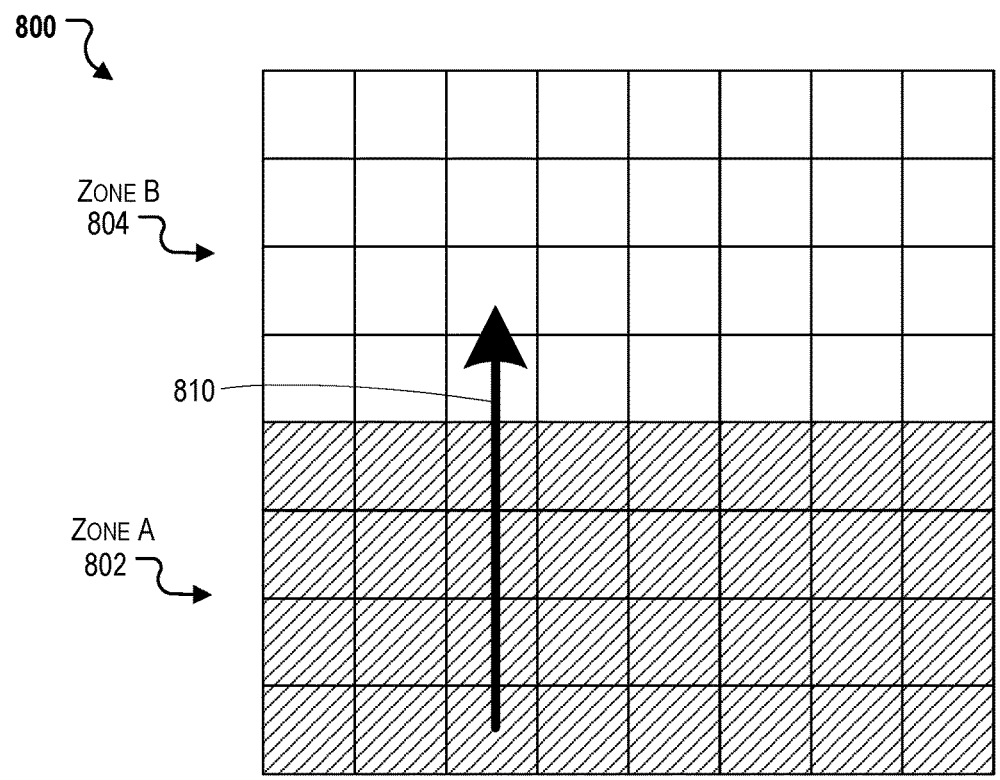
FIG. 8A depicts an example grid for an observed area that can be employed by implementations of the present disclosure.

FIG. 8A depicts an example grid 800 for an observed area that can be employed by the described person detection system to accept or count movement (represented by the arrow 810) as a person. The example grid 800 includes two zones, zone A 802 and zone B 804.

Figure 8B:
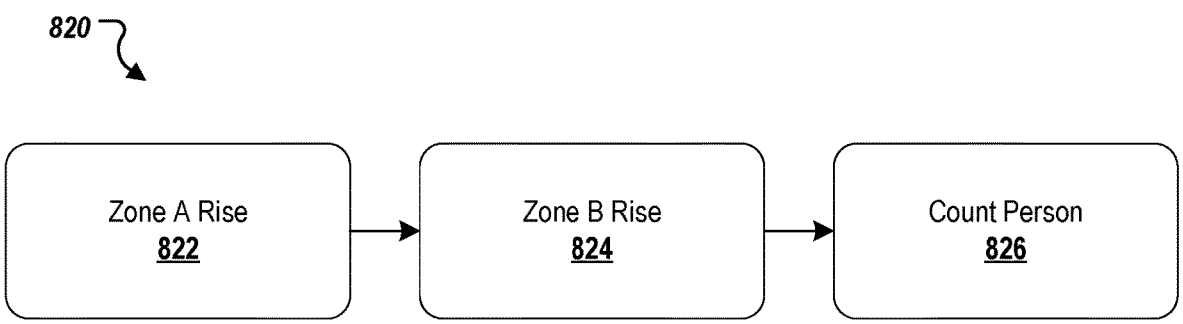
FIG. 8B depicts an example process using the example grid depicted in FIG. 8A that can be employed by implementations of the present disclosure.

FIG. 8B depicts an example process 820 that can be employed by the described person detection system using the grid 800 to observe a person reaching zone B 804 after first having been observed in zone A 802. At step 822, the system observes a temperature rise in zone A 802 and ignores data in zone B 804 until the zone A 802 is triggered. After zone A 802 is triggered, at step 824, the system observes zone B 804 for a temperature rise. At step 826, after the heat signature has been observed in zone A 802 and then in zone B 804 the system reaches the trigger condition and determines the presence or movement of a person in the observed area (e.g., adds a count for the number of observed persons in the area).

Figure 9A:
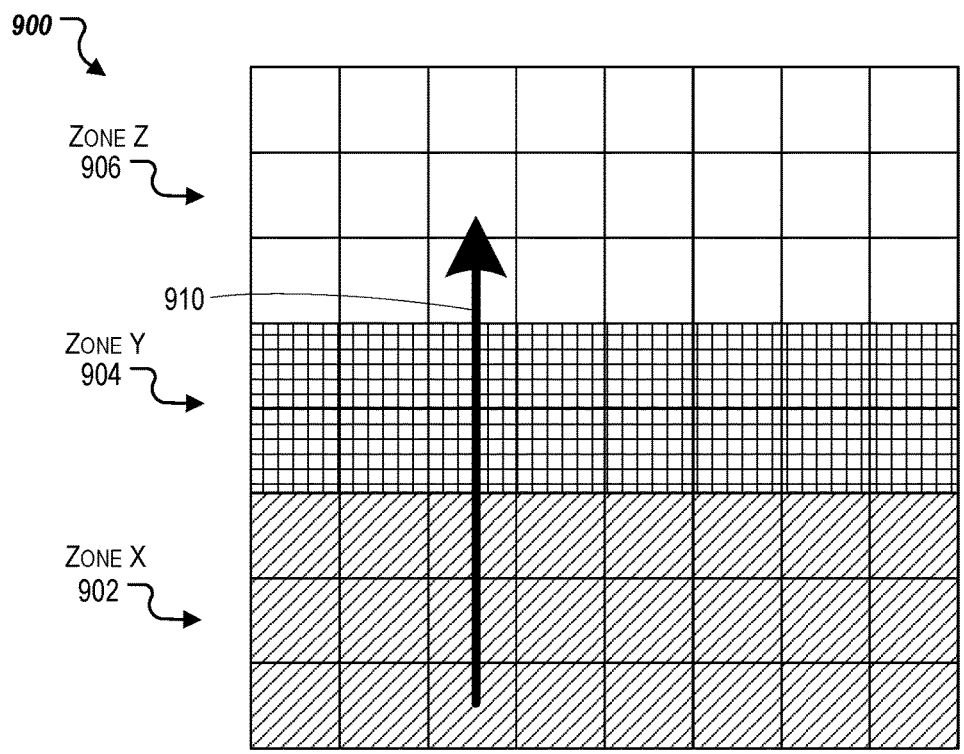
FIG. 9A depicts another example grid for an observed area that can be employed by implementations of the present disclosure.

To increase or extend the system's resistance to noise and decrease the chances that random noise could be accepted or counted as a person, the observed area can be divided into additional zones and respective conditions added for each of these zones. FIG. 9A depicts an example grid 900 for an observed area with an additional zone. The example grid 900 includes zone X 902, zone Y 904, and zone Z 906. Again, the arrow 910 represents a person's movement through the observed area.

Figure 9B:
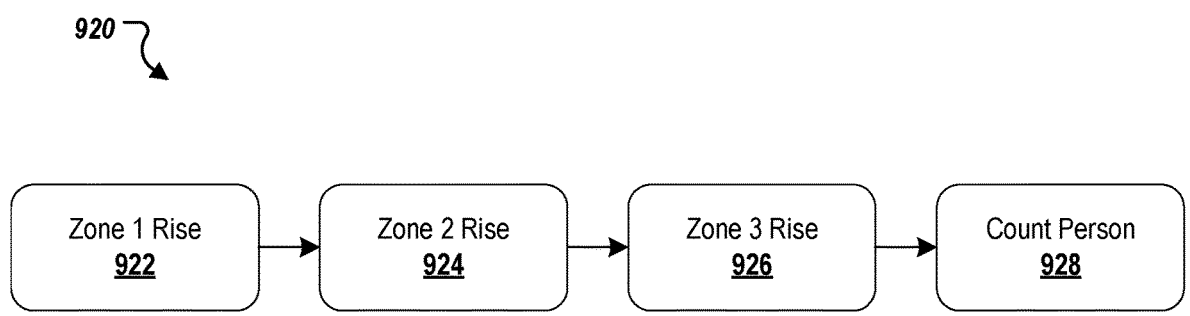
FIGS. 9B and 9C depict example processes using the example grid depicted in FIG. 9A that can be employed by implementations of the present disclosure.

FIG. 9B depicts an example process 920 that can be employed by the described person detection system using the grid 900. Similar to process 820, process 920 observes a person reaching zone Z 906 after first having been observed in zone X 902 followed by zone Y 904. At step 922, the system observes a temperature rise in zone X 902 and ignores data in the other zones (zone Y 904 and zone Z 906) until the zone X 902 is triggered. After zone X 902 is triggered, at step 924, the system observes zone Y 904 for a temperature rise and ignores data in the other zones (zone X 902 and zone Z 906). After zone X 902 is triggered followed by zone Y 904, at step 926, the system observes zone Z 906 for a temperature rise. At step 928, after the heat signature has been observed in zone X 902, followed by zone Y 904, and followed by zone Z 906 the system reaches the trigger condition and determines the presence or movement of a person in the observed area (e.g., adds a count for the number of observed persons in the area).

Figure 9C:
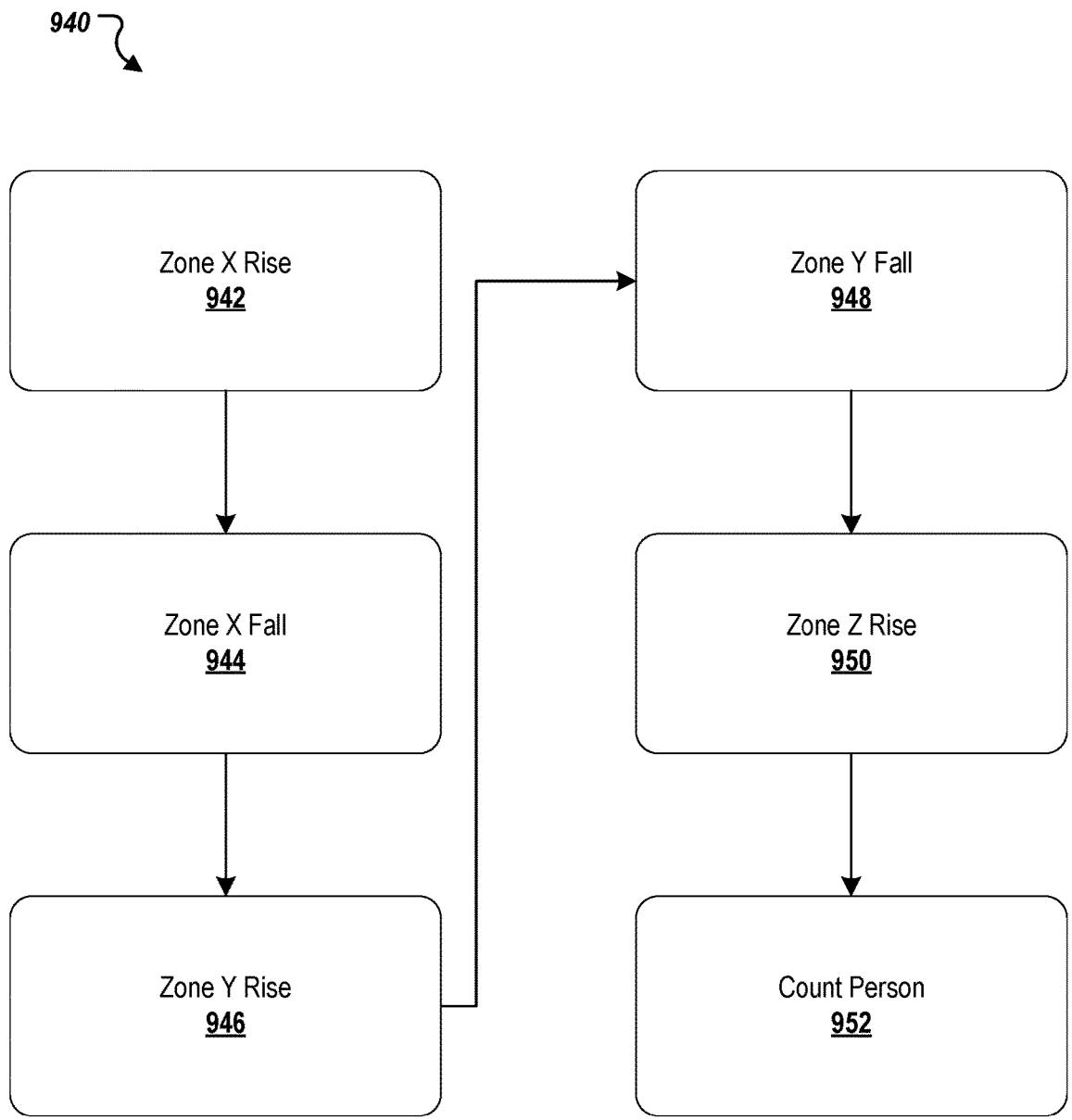

FIG. 9C depicts a process 940 that extends the system's resistance to noise even more by first observing a person exiting a zone before being detected in the next zone. As an example using the example grid 900, the system is configured to observe a person's path denoted by the directional arrow 910. For example, a temperature rise is first observed (942) in zone X 902 followed by a temperature fall (944) in zone X 902. Next, the temperature is observed (946) to rise in zone Y 904 and then fall (948) in zone Y 904. Finally, the temperature is observed (950) to rise in zone Z 906 at which point the presence or movement of a person in the observed area is registered (952), and for example, a count for the number of observed persons in the area is increased.

In some embodiments, the system improves noise immunity by preferring previous states when both forward-going and backward-going conditions are met. For example, when the system is waiting to observe zone B 904 fall (e.g., after step 946) and instead observes a rise in zone X 902, the system is configured to jump to the previous state (e.g., a rise in zone X 904) creating a directional preference. While continuous human movement through the observed area will meet these conditions in order, random chance has an equal likelihood of triggering any given state. Therefore, the longer the sequence, the more likely a previous state will be chosen by random chance.

Generally, a person walks through the observed area in some finite amount of time while a random process may bounce back and forth between intermediate states before eventually reaching the trigger condition (e.g., counting a person in the observed area). Therefore, in some embodiments, a timeout after which the system resets to a default state, is employed to improve noise immunity. For example, when system moves away from an initial state (e.g., a temperature rise is detected in a first zone), a timer begins counting. When all conditions are not met to reach the trigger condition before the timer elapses, the state is reset back to an initial condition. Generally, a timeout is configured so that a person's movement can easily meet the conditions before the timer elapses but caps the amount of time a random process has to "guess" the correct combination of states to reach the trigger condition. By adding ordered conditions that are traversed in sequence and within a particular time, the described system provides stability in the same way that a longer password is harder to guess by brute force. The added complexity of the sequence is easily met by valid movement but is extremely difficult to meet for a random process.

In some embodiments, a zone-based system is not employed, and the process is extended to tracking an individual signature through the region observed. Using such a process, the system is configured to observe heat signatures that originate in certain parts of the observed area that are away from a trigger zone (where the trigger condition is met). Once a signature is observed, the system is configured to prefer (e.g., weight) information from adjacent areas to determine that the heat signature is moving away from the trigger region rather than toward it. Furthermore, in some embodiments, the timeout condition is employed such that a heat signature, once detected, has a limited amount of time to reach the trigger region before being ignored. The example processes and grids depicted in FIGS. 8A, 8B, and 9A-9C are described for simplicity any number of zones may be employed based on, for example, the size of the observed area or the pattern of movement through the area.

Figure 10A:
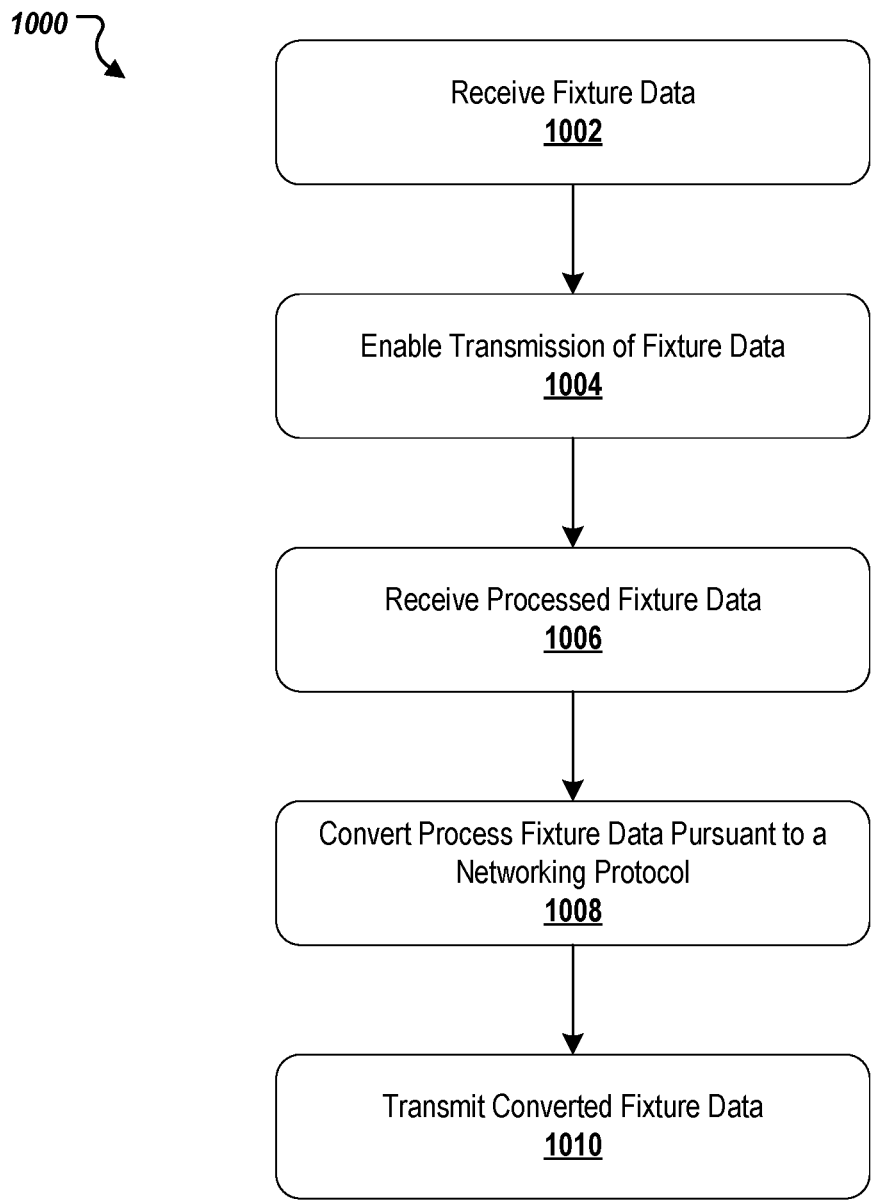
FIGS. 10A-10B depict flowcharts of non-limiting example processes that can be implementation by embodiments of the present disclosure.
Figure 10B:
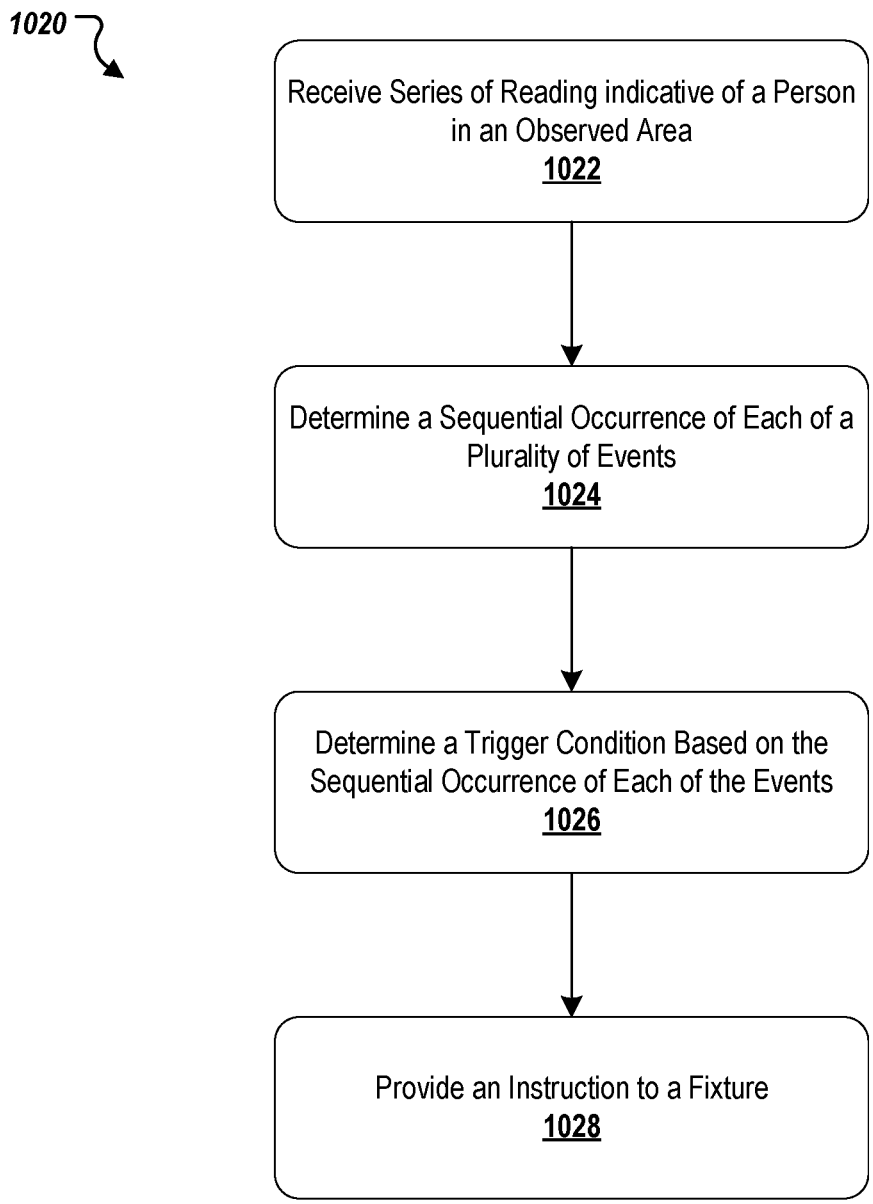

FIGS. 10A and 10B depict a flowchart of non-limiting, exemplary process 1000 and 1020 respectively that can be implementation by embodiments of the present disclosure. The flowchart depicted in FIG. 10A illustrates a process 1000 for monitoring and managing a facility. The flowchart depicted in FIG. 10B illustrates a process 1020 for detecting or following a person within an observed area.

Figure 11:
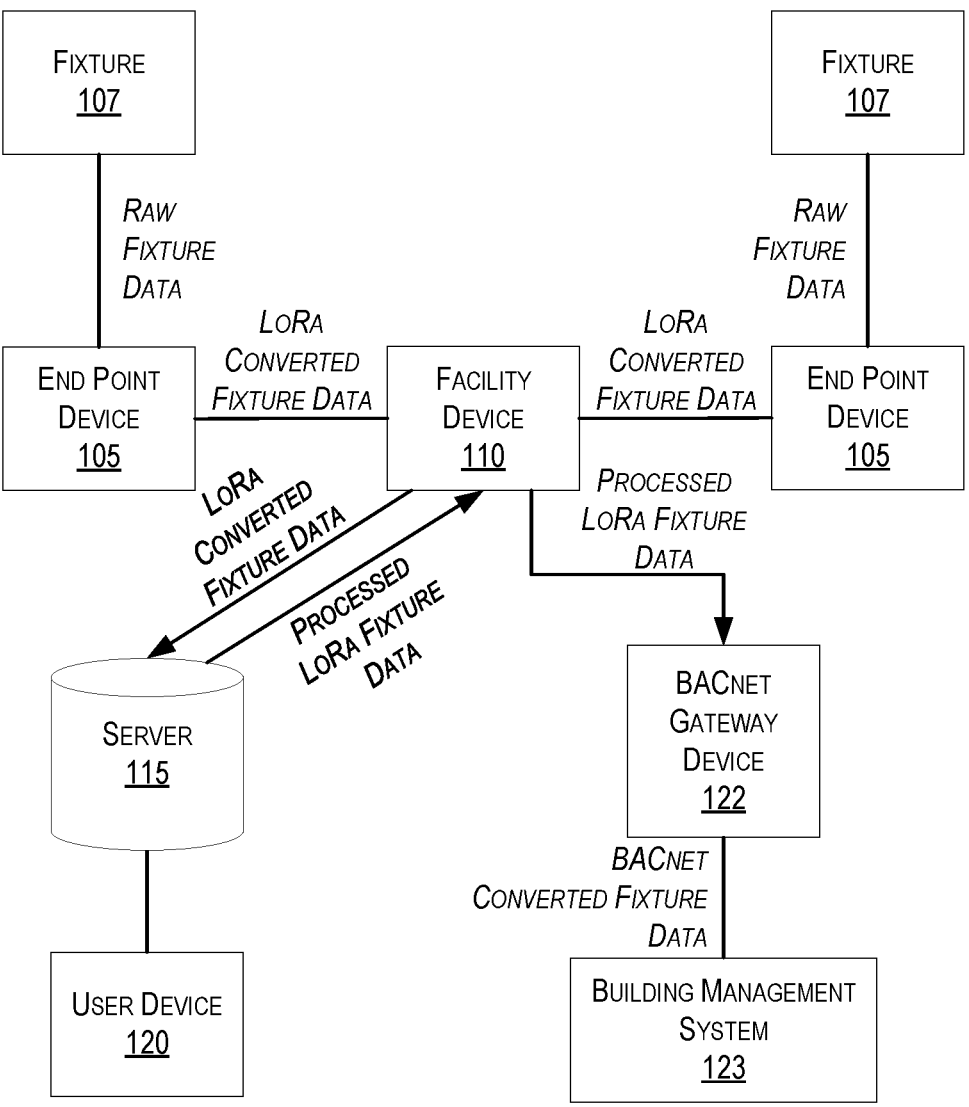
FIG. 11 depicts a non-limiting exemplary example of the communication between components of the system depicted in FIG. 1.

For clarity of presentation, the description that follows generally describes the processes 1000 and 1020 in the context of FIGS. 1-9B and 11. For example, the process 1000 is described with reference to FIG. 11. FIG. 11 depicts an exemplary embodiment of communication between the components of the system 100. However, it will be understood that the process the processes 1000 and 1020 may be performed, for example, by any other suitable system or a combination of systems as appropriate. In some embodiments, a processor is configured to execute the process 1000 or the process 1020. In some embodiments, the processor is embedded within a fixture. In some embodiments, the fixture receives data from a sensor. In some embodiments, the sensor and the processor are housed within a single fixture.

Referencing FIG. 10A, at 1002, fixture data is received from at least one EM element 125 of the fixture 107 associated with the facility. As noted above, in some embodiments, the EM elements 125 of the fixture 107 are configured to monitor or influence the operation of the fixture 107. Accordingly, in some embodiments, the fixture data for a particular fixture 107 is collected by the EM element(s) 125 where it is associated with that particular fixture 107. In some embodiments, the fixture data collected by the EM elements 125 of the fixture 107 is transmitted to the endpoint device 105 via a communication link between the fixture 107 and the endpoint device 105. In some embodiments, the fixture data is converted pursuant to a specific networking protocol consistent with a network connection between one or more components of the system 100. For example, in some embodiments, the endpoint device 105, the facility device 110, and the server 115 communicate via LoRa networking or communication protocols. Accordingly, in some embodiments, the electronic processor 200 of the endpoint device 105 converts the fixture data pursuant to LoRa networking protocols for transmission over a LoRa connection between the endpoint device 105 and the facility device 110. With reference to FIG. 11, in some embodiments, the fixture(s) 107 transmit "raw" fixture data to the endpoint device(s) 105. In response to receiving the raw fixture data, the endpoint device(s) 105 convert the "raw" fixture data pursuant to a specific networking protocol (in this example, a LoRa protocol). From 1002, the process 1000 proceeds to 1004.

At 1004, the fixture data is transmitted to a remote device for processing. For example, in some embodiments, the electronic processor 200 of the endpoint device 105 transmits the LoRa converted fixture data for processing over a network associated with the networking protocol. As described above, in some embodiments, the electronic processor 200 transmits the LoRa converted fixture data to the facility device 110 (as a gateway device). As illustrated in FIG. 11, in some embodiments, the endpoint device(s) 105 transmit the LoRa converted fixture data to the facility device 110. In some embodiments, the endpoint device 105 (e.g., the electronic processor 200) maintains a backlog of data packets (e.g., the LoRa converted data) until a connection to, for example, the facility device 110 is available (e.g., when a connection to the facility device 110 is temporarily unavailable). In some embodiments, the facility device 110 forwards the LoRa converted fixture data to a remote device, server, or database, for processing in the cloud, such as, for example, the server 115, the user device 120, or a combination thereof (as depicted in FIG. 11). In some embodiments, the server 115 (via an electronic processor of the server 115) receives fixture data (e.g., the LoRa converted fixture data) from the facility device 110. From 1004, the process 1000 proceeds to 1006.

At 1006, the processed fixture data is received by the facility device 110 (for example, the first gateway device) from server 115. The server 115 processes the received fixture data to determine, for example, insights, usage patterns, alerts, and other data associated with the one or more facilities, including the fixtures 107 thereof. As an example, in some embodiments, a user employs the user device 120 (or another remote device) to access and interact with the fixture data. In some embodiments, the server 115 processes the received data to monitor a battery or power level (e.g., as a battery condition or characteristic) associated with the endpoint device 105. In some embodiments, the user views and interact with the determined usage patterns, which allow a facility entity or maintainer insights into, for example, how to optimize cleaning and maintenance schedules (e.g., for preventative or predicted maintenance), whether there is a need for additional facilities, endpoint devices, or a combination thereof, and the like. As noted above, in some embodiments, the server 115 is configured to monitor and manage one or more facilities, including the fixtures 107 therein. As seen in FIG. 11, in some embodiments, after processing the LoRa converted fixture data, the server 115 may transmit the processed LoRa fixture data to the facility device 110. In some embodiments, in response to receiving the processed LoRa fixture data, the facility device 110 provides the processed LoRa fixture data to the BACnet gateway device 122. In some embodiments, the server 115 may transmit the processed LoRa fixture data directly to the BACnet gateway device 122 (not shown). From 1006, the process 1000 proceeds to 1008.

At 1008, in response to receiving the processed LoRa fixture data, the BACnet gateway device 122 converts the processed LoRa fixture data pursuant to a networking protocol associated with a building management solution or system (e.g., the BMS 123). As noted above, in some embodiments, the BMS 123, including the sub-systems included therein, communicates via BACnet communication protocol(s). As noted above, in some embodiments, the BMS 123 is associated with one or more particular vendors. As an example, in some embodiments, the BMS 123 includes a ventilation system associated with "Vendor A" and a security system associated with "Vendor B." In some embodiments, data associated with the BMS 123 is accessible to a user via a vendor specific dashboard (e.g., a BMS or visual dashboard), such as a browser application or dedicated software application designed by a particular vendor. Accordingly, in some embodiments, the BACnet gateway device 122 converts, via the BACnet electronic processor 400, the processed fixture data from a LoRa protocol to a BACnet protocol. From 1008, the process 1000 proceeds to 1010.

At 1012, after converting the processed LoRa fixture data, the BACnet gateway device 122 transmits the converted fixture data for display via a BMS or visual dashboard associated with the BMS 123. As noted above, in some embodiments, the converted fixture data includes one or more alerts, such as a water alert, a waste alert, a fire alert, an indoor air pollutant alert, a temperature alert, a contamination alert, and the like. Accordingly, in some embodiments, the BACnet gateway device 122 transmits the one or more alerts for display via the BMS or visual dashboard associated with the BMS 123. For example, as depicted in FIG. 11, in some embodiments, the BACnet gateway device 122 may transmit the converted fixture data (as BACnet converted fixture data) to the BMS 123 (or one or more components therein). From 1012, the process 1000 ends.

Referencing FIG. 10B, at 1022, a series of readings indicative of a person in the observed area is received from a sensor. The sensor having a noise threshold and configured to collect information regarding an observed area. The observed area is divided into a plurality of zones. In some embodiments, the sensor comprises a temperature sensor, a passive infrared sensor, an active infrared sensor, a laser sensor, a sonic sensor, a LIDAR sensor, an ultrasound sensor, a pressure sensor, or a proximity sensor. In some embodiments, the sensor is embedded within a light fixture. In some embodiments, the sensor is positioned directly over the observed area. In some embodiments, the sensor is positioned at an angle respective to the observed area. In some embodiments, the series of readings indicative of the person in the observed area are received wirelessly from the sensor. In some embodiments, the series of readings indicative of the person in the observed area are received via wired connection from the sensor. From 1022, the process 1020 proceeds to 1024.

At 1024, a sequential occurrence of each of a plurality of ordered events is determined by applying a detection threshold value to the series of readings. In some embodiments, the detection threshold value is lower than the noise threshold. In some embodiments, each of the plurality of ordered events is associated with at least one of the plurality of zones. In some embodiments, a control command for the sensor is determined based on the received series of readings indicative of the person in the observed. In some embodiments, the control command is provided to the sensor. In some embodiments, the events are ordered based on a juxtaposition of each of the associated at least one of the plurality of zones. In some embodiments, determining the sequential occurrence of each of the plurality of ordered events includes employing a directional preference to improve noise immunity by preferring previous states when both a forward-going condition and a backward-going condition are met. In some embodiments, the sensor is a grid-based infrared sensor. In some embodiments, the series of readings indicative of the person in the observed area includes a heat signature of the person. In some embodiments, the plurality of ordered events includes a rise or a fall of the heat signature within the associated at least one of the plurality of zones. From 1024, the process 1020 proceeds to 1026.

At 1026, a trigger condition is determined based on the sequential occurrence of each of the plurality of ordered events. In some embodiments, the trigger condition is determined based on the sequential occurrence of each of the plurality of ordered events within a configured time allotment. In some embodiments, an initial condition is reset when the configured time allotment is not met. In some embodiments, the trigger condition includes determining that the person has moved to a particular one of or a group of the plurality of zones. In some embodiments, the trigger condition includes determining that the person has exited the observed area in a particular direction. In some embodiments, the trigger condition includes determining or tracking a movement of the person within the observed area. In some embodiments, the trigger condition includes determining a presence of the person within the observed area. In some embodiments, the trigger condition includes counting the person within the observed area. From 1026, the process 1020 proceeds to 1028.

At 1028, an instruction is provided to a fixture based on the trigger condition. In some embodiments, the sensor is the fixture to which the instruction is provided. In some embodiments, the instruction is an activation command. In some embodiments, the fixture is a remote indicator or a sign. In some embodiments, the instruction includes triggering an actuator in the fixture. In some embodiments, the instruction includes a change to a state or a behavior of the fixture is a remote indicator or a sign. In some embodiments, the change to the state includes exiting a low power state. In some embodiments, an alert is determined based on the trigger condition. In some embodiments, the alert is provided to a visual dashboard of a BMS. From 1028, the process 1020 ends.

Examples

In some embodiments, the fixture 107 is a faucet. The server 115 analyzes the fixture data to, for example, monitor the communications between the EM elements 125 of a fixture 107 (e.g., a sensor and an actuator) to track, among other things, activations (e.g., "ON" and "OFF" signals); monitor temperature data from a temperature sensor (as an EM element 125 of the fixture 107) either positioned within the drain or the faucet itself to detect the flow of water by; determine when a run-on condition has occurred in response to determine that a predetermined period of time set by a user is exceeded and the faucet did not return to an "OFF" condition or water flow is still detected; or calculate water usage indirectly based on a duration of time that the valve of the faucet remains open and an estimated water flow rate.

In some embodiments, the fixture 107 is a flush valve. The server 115 analyzes the fixture data to, for example, monitor a magnitude of a voltage or current supplied to the EM element 125 (e.g., an actuator) of the fixture 107 to track when a flushing event is initiated; determine a length of time a person is detected using the fixture 107 on any given instance; or determine when an "ON" signal is provided (e.g., a person is detected) but no corresponding movement of the valve occurs. In some embodiments, the server 115 provides an error signal such that an alert is generated via, for example, the facility device 110, the user device 120, another component of the system 100, or a combination thereof. In some embodiments, such faults are determined by detecting an elevated voltage or current rate (e.g., a motor is bound).

In some embodiments, the fixture 107 is a resource dispenser. The server 115 analyzes the fixture data to, for example, monitor a magnitude of a voltage or current supplied to an EM element 125 (e.g., an actuator) of a fixture 107 to track when a resource dispensing event has occurred; monitor a level or amount of resource remaining in a reservoir of the fixture 107; or calculate an amount of resource remaining in a reservoir of the fixture 107 (e.g., by subtracting a predetermined volume or amount of resource discharged during a resource dispensing event for each detected activation). In some embodiments, when the server 115 determines that a level or amount of resource remaining in a reservoir of the fixture 107 has fallen below a predetermined amount or level, the server 115 provides an error signal such that an alert is generated via, for example, the facility device 110, the user device 120, another component of the system 100, or a combination thereof.

In some embodiments, the fixture 107 is a contamination monitor. The server 115 analyzes the fixture data to, for example, detect a presence of a contaminant and determine a contamination level of the contaminant. For example, in some embodiments, the server 115 analyzes the fixture data to detect the presence of *legionella*, and in response, determine a contamination level of *legionella* and compare the contamination level to a predetermined contamination threshold, which is set based on, for example, a type of contaminant. In some embodiments, server 115 compares a first type of contaminant to a first threshold and a second type of contaminant to a second threshold different than the first threshold. In some embodiments, the server 115 generates an alert or warning (e.g., a contamination alert) based on the comparison of the contamination level to the predetermined contamination threshold such that the alert may be generated via, for example, the facility device 110, the user device 120, the BMS 123, another component of the system 100, or a combination thereof. In some embodiments, when the server 115 determines that a contamination level exceeds a predetermined contamination threshold (such that the contamination level is at a dangerous level), the server 115 provides an alert signal such that an alert may be generated via the BMS 123 (such as a display device of the BMS 123).

In some embodiments, the fixture 107 is a thermal mixing valve. The server 115 analyzes the fixture data to, for example, monitor a water temperature (e.g., a water temperature associated with water flowing through a faucet, an input or control provided via a valve actuator (e.g., an EM element 125), or a combination thereof). In some embodiments, the server 115 analyzes the fixture data to detect a temperature associated with water flowing through a faucet such that the temperature is monitored in comparison to a temperature threshold or range. In some embodiments, the server 115 generates an alert or warning (e.g., a temperature alert) based on the comparison of the temperature to the temperature threshold or range. In some embodiments, when the temperature detected by the server 115 is outside of a temperature range (e.g., too hot, or too cold) a warning or alert is issued. In some embodiments, when the temperature exceeds the temperature range or threshold, the warning or alert indicates a scalding condition where the water flowing through the faucet is too hot. In some embodiments, when the temperature is below the temperature range or threshold, the warning or alert indicates a cold-water condition where the water flowing through the faucet is too cold, which indicates a fault with a hot water heater or heating system of a building.

In some embodiments, the fixture 107 is an air quality monitor. The server 115 analyzes the fixture data to, for example, monitor an air condition associated with a facility. In some embodiments, the server 115 detects the presence of an indoor air pollutant, an indoor air pollutant level, or a combination thereof. In some embodiments, the server 115 detects the presence of carbon monoxide and, in response to detecting the presence of carbon monoxide, determine an amount of carbon monoxide (e.g., an indoor air pollutant level associated with the carbon monoxide). In some embodiments, the server 115 compares the indoor air pollutant level to a predetermined indoor air pollutant threshold or range. In some embodiments, based on the comparison, the server 115 generates an alert or warning (e.g., an indoor air pollutant alert). In some embodiments, the indoor air pollutant alert includes the presence of the indoor air pollutant, a facility with the indoor air pollutant (for example, a location of the facility), the indoor air pollutant level, a severity indication, and the like.

In some embodiments, the fixture 107 is a door handle. The server 115 analyzes the fixture data to, for example, monitor use of a door associated with the door handle to detect an occupancy of a family bathroom by monitoring the opening and closing of the door handle; detect an overall use of a specific bathroom stall based on how often the door handle associated with that specific bathroom stall is opened and closed within a predetermined period of time (e.g., a 24-hour period, a hour period, a week, and the like), and the like. In some embodiments, the door handle includes a consumable, refillable plastic paper, that includes microbial protection. In some embodiments, such plastic paper is released by cartridges that require refill on a regular basis. In some embodiments, the server 115 detects when a cartridge is almost empty and needs refilling and trigger an alert or warning.

In some embodiments, the fixture 107 is a fire protection device. The server 115 analyzes the fixture data to, for example, monitor an environment (e.g., a facility) for the presence of a fire condition (e.g., smoke) or determine an operational status of the fire protection device. In some embodiments, the server 115 generates an alert or warning (e.g., a fire alert) in response to detecting the presence of a fire condition. In some embodiments, when the server 115 detects the presence of smoke in a facility, the server 115 generates a fire alert associated with the facility. In some embodiments, such a fire alert includes the presence of the fire condition, an indication of what the fire condition is, a facility with the fire condition (e.g., a location of the facility), a severity of the fire condition, an automated action triggered in response to detecting the fire condition (e.g., activation of a sprinkler system), a duration of the automated action, a duration of the fire condition, a current status of the fire condition (e.g., whether the fire condition is increasing or decreasing), and the like. In some embodiments, the server 115 generates an alert or warning (e.g., a maintenance alert) based on an operational status of the fire protection device. In some embodiments, when the server 115 determines that the operational status for the fire protection device is not operational, the server 115 generates a maintenance alert indicating that the fire protection device is not operational.

In some embodiments, the fixture 107 is a waste receptacle. The server 115 analyzes the fixture data to, for example, monitor the level or amount of waste in the waste receptacle or monitors usage of the waste receptacle (e.g., how many times the waste receptacle is used). In some embodiments, the server 115 detects a current level or amount of waste in the container or receptacle. In some embodiments, the server 115 determines the number of times a lid of the waste receptacle is opened (or triggered to open via, for example, a foot-pedal). In some embodiments, the server 115 determines (e.g., via motion sensing) the number of times that waste is deposited into the waste receptacle. In some embodiments, the server 115 compares the amount of waste in the waste receptacle, the detected usage of the waste receptacle, or a combination thereof to a waste threshold. In some embodiments, the server 115 generates an alert or warning (e.g., a waste alert) based on the comparison. In some embodiments, where the waste threshold represents a maximum amount of waste for the waste receptacle, the server 115 generates a waste alert that indicates a need to empty the waste receptacle. In some embodiments, where the waste threshold represents a maximum usage amount for the waste receptacle, the server 115 generates a waste alert that indicates a need to empty the waste receptacle.

In some embodiments, the fixture 107 is a drain. The server 115 analyzes the fixture data to, for example, monitor an amount of water flowing through the drain. In some embodiments, the drain is a sink drain. The server 115 analyzes the fixture data to, for example, monitor an amount of water flowing through the sink drain such that a usage of a sink associated with the sink drain may be monitored, a run-on condition of a faucet associated with the sink drain may be detected, and the like. In some embodiments, the drain is a floor drain. The server 115 analyzes the fixture data to, for example, monitor an amount of water flowing through the floor drain such that a usage of a shower stall associated with the floor drain may be monitored, an over-flow condition or leak condition of another fixture (such as a facet, a toilet, or the like) may be detected, and the like. In some embodiments, the drain is a roof drain. The server 115 analyzes the fixture data to determine maintenance needs, predict remaining life cycle of the roof drain, monitor a flow rate of water in comparison to other roof drains, and the like. In some embodiments, the server 115 compares the fixture data to one or more water thresholds or ranges and generates an alert or warning (e.g., a water alert) based on the comparison. In some embodiments, the water alert indicates a need to service or perform maintenance on a roof drain, a run-on condition, an over-flow condition or leak condition, an obstructed condition, and the like.

In some embodiments, the server 115 analyzes the fixture data to monitor the battery life (e.g., an energy level or energy usage) using various indicators, such as a graphical representation of a fuel gauge. In some embodiments, the server 115 generates alerts and warnings in response to detecting a predetermined energy level. In some embodiments, the predetermined energy level indicates an end of battery life scenario, an energy source replacement scenario, and the like. In some embodiments, the server 115 provides a low energy level alert to a user of the user device 120 (via, for example, a display device of the user device 120) when a predetermined energy level indicating a low energy level s detected.

Although not illustrated, in some embodiments the BMS 123 includes one or more computing devices, servers, databases, or other devices. In some embodiments, the BMS 123 includes a computing device (similar to the user device 120). In some embodiments, the computing device (or another component of the BMS 123) integrates the BACnet converted fixture data with additional data from one or more building sub-systems included in the BMS 123. As an example, in some embodiments, the computing device (or another component of the BMS 123) integrates the BACnet converted fixture data and the additional data as building data, such that the building data may be displayed to a user via, for example, a BMS or visual dashboard, such that a user may access and interact with the building data. Accordingly, in some embodiments, the computing device (or another component of the BMS 123) receives a user interaction with the BMS or visual dashboard. In some embodiments, the user interaction is associated with the building data (or a portion thereof). In some embodiments, based on the received user interaction, the computing device (or another component of the BMS 123) controls one or more sub-systems included in the BMS 123 or the fixtures 107. As an example, in some embodiments, the computing device (or another component of the BMS 123) provides a control signal for controlling a building sub-system, one or more fixtures 107, or a combination thereof, based on the user interaction.

In some embodiments, the converted fixture data includes a contamination alert indicating the presence of contamination at a particular contamination level. In some embodiments, the BMS 123 provides the contamination alert to a user of the BMS 123 via a display device of the BMS 123 (e.g., the visual dashboard of the BMS 123). In response to the contamination alert, the user may interact with the visual dashboard of the BMS 123 to initiate an action addressing the contamination alert. As an example, the user may turn off a water service line associated with the contamination.

In some embodiments, the converted fixture data includes an indoor air pollutant alert indicating the presence of an indoor air pollutant alert in a facility. In some embodiments, the BMS 123 provides the indoor air pollutant alert to a user of the BMS 123 via a display device of the BMS 123 (e.g., the visual dashboard of the BMS 123). In response to the indoor air pollutant alert, the user may interact with the visual dashboard of the BMS 123 to initiate an action addressing the indoor air pollutant alert. As an example, where the indoor air pollutant alert indicates a high severity level, the user may "close" the facility with the presence of the indoor air pollutant, such as by remotely locking a door to the facility, triggering a visual status indicator for the facility (e.g., a light up closed sign), and the like. As another example, where the indoor air pollutant alert indicated a low severity level, the user may schedule an indoor air pollutant evaluation or test by a testing entity.

Abnormal Usage

In some embodiments, the converted fixture data is correlated to determine an abnormal usage of the facility (e.g., when a user enters a stall and then quickly exits without a flush event). In some embodiments, system determines such an event based on a correlation among/between data received from various fixtures relates to a specific area or facility (e.g., an occupancy light data and flush valve associated with a bathroom stall). In some embodiments, various fixtures are paired/grouped, and the provided data correlated. As an example, when an occupancy light entry/exit sequence occurs without a corresponding flush valve actuating within that sequence timeframe, the system correlates his data to determine that there is a possibility that the stall/toilet is in an unusable condition—and that the user, upon seeing this condition, decided not to use the toilet/stall and exited the stall without actuating the flush valve. While a single occurrence of this sequence may not show conclusive that the stall is in an unusable condition (e.g., a user could have entered the stall to change clothes), several consecutive instances of this sequence may show an increased the likelihood that the stall is in an unusable condition. Therefore, by configuring the described system to analyze and determine occurrences of such a sequence, an alert can be sent via the BMS 123 to a facilities manager to investigate the situation in the designated stall.

Short Duration

In some embodiments, the converted fixture data is analyzed to determine the duration of a user's entry/exit sequence as observed by, for example, an occupancy light. As described above, when a user encounters a stall/toilet that is in an unusable condition, it is likely that the user, upon entering the stall and seeing the condition, quickly turns around and exits the stall. Therefore, in some embodiments, the described system processing this duration information to determine when a stall is in an unusable condition. For example, a "Short Duration" visit of less than a configured amount of time (e.g., 5 seconds or less) indicates that the respective stall is unusable. In some embodiments however, a single short duration does not necessarily or conclusively mean that the stall is in an unusable condition. In such embodiments, the the converted fixture data is analyzed is analyzed to determine, for example, a pattern of several consecutive short duration visits. Such a pattern increases the likelihood of accurately detecting a stall in an unusable condition. In some embodiments, an alert is provided via the BMS 123 to a facilities manager to investigate the situation in the designated stall when such a pattern is detected.

Non-Transitory Computer Readable Storage Medium

In some embodiments, the platforms, systems, media, and methods disclosed herein include one or more non-transitory computer readable storage media encoded with a program including instructions executable by the operating system of an optionally networked computer. In further embodiments, a computer readable storage medium is a tangible component of a computer. In still further embodiments, a computer readable storage medium is optionally removable from a computer. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

In some embodiments, the platforms, systems, media, and methods disclosed herein include at least one computer program, or use of the same. A computer program includes a sequence of instructions, executable in the computer's CPU, written to perform a specified task. Computer readable instructions may be implemented as program modules, such as functions, objects, API, data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Machine Learning

In some embodiments, machine learning algorithms are employed to build a model to determine a status for an area of a facility (e.g., a stall). In some embodiments, machine learning algorithms are employed to build a model to determine the filter relevant or chorological contact information for a user. Examples of machine learning algorithms may include a support vector machine (SVM), a naïve Bayes classification, a random forest, a neural network, deep learning, or other supervised learning algorithm or unsupervised learning algorithm for classification and regression. The machine learning algorithms may be trained using one or more training datasets. For example, previously received contextual data may be employed to train various algorithms. Moreover, as described above, these algorithms can be continuously trained/retrained using real-time user data as it is received. In some embodiments, the machine learning algorithm employs regression modelling where relationships between variables are determined and weighted. In some embodiments, the machine learning algorithm employ regression modelling, wherein relationships between predictor variables and dependent variables are determined and weighted.

Software Modules

In some embodiments, the platforms, systems, media, and methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft® .NET or Ruby on Rails (RoR). In some embodiments, a web application utilizes one or more database systems including, by way of non-limiting examples, relational, non-relational, object oriented, associative, and eXtensible Markup Language (XML) database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or XML. In some embodiments, a web application is written to some extent in a presentation definition language such as Cascading Style Sheets (CSS). In some embodiments, a web application is written to some extent in a client-side scripting language such as Asynchronous JavaScript and XML (AJAX), Flash® ActionScript, JavaScript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Mobile Application

In some embodiments, a computer program includes a mobile application provided to a mobile computer. In some embodiments, the mobile application is provided to a mobile computer at the time it is manufactured. In other embodiments, the mobile application is provided to a mobile computer via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, JavaScript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Google® Play, Chrome WebStore, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable complied applications.

Data Stores

In some embodiments, the platforms, systems, media, and methods disclosed herein include one or more data stores. In view of the disclosure provided herein, those of skill in the art will recognize that data stores are repositories for persistently storing and managing collections of data. Types of data stores repositories include, for example, databases and simpler store types, or use of the same. Simpler store types include files, emails, and the like. In some embodiments, a database is a series of bytes that is managed by a DBMS. Many databases are suitable for receiving various types of data, such as weather, maritime, environmental, civil, governmental, or military data. In various embodiments, suitable databases include, by way of non-limiting examples, relational databases, non-relational databases, object-oriented databases, object databases, entity-relationship model databases, associative databases, and XML databases. Further non-limiting examples include SQL, PostgreSQL, My SQL, Oracle, DB2, and Sybase. In some embodiments, a database is internet-based. In some embodiments, a database is web-based. In some embodiments, a database is cloud computing based. In some embodiments, a database is based on one or more local computer storage devices.

While preferred embodiments of the present disclosure have been shown and described herein, it will be obvious to those skilled in the art that such embodiments are provided by way of example only. Numerous variations, changes, and substitutions will now occur to those skilled in the art without departing from the described system. It should be understood that various alternatives to the embodiments described herein may be employed in practicing the described system.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results.

Moreover, the separation or integration of various system modules and components in the implementations described earlier should not be understood as requiring such separation or integration in all implementations, and it should be understood that the described components and systems can generally be integrated together in a single product or packaged into multiple products. Accordingly, the earlier description of example embodiments does not define or constrain this disclosure. Other changes, substitutions, and alterations are also possible without departing from the spirit and scope of this disclosure.

Thus, the invention provides, among other things, a system for detecting or following a person within an observed area. Various features and advantages of the invention are set forth in the following claims.

What is claimed is:

1. A person detection system comprising:
    a sensor having a noise threshold and configured to collect information regarding an observed area;
    a processor configured to:
        receive, from the sensor, a series of readings indicative of a person in the observed area, wherein the observed area is divided into a plurality of zones;
        determine a sequential occurrence of each of a plurality of ordered events by applying a detection threshold value to the series of readings, wherein the detection threshold value is lower than the noise threshold, wherein each of the plurality of ordered events is associated with at least one of the plurality of zones, and wherein the events are ordered based on a juxtaposition of the plurality of zones;
        determine a trigger condition based on the sequential, collective occurrence of each of the plurality of ordered events within a configured time allotment; and
        provide an instruction to a fixture based on the trigger condition.

2. The system of claim 1, wherein the processor is further configured to:
    determine a control command for the sensor based on the received series of readings indicative of the person in the observed area; and
    provide the control command to the sensor.

3. The system of claim 1, wherein an initial condition is reset when the configured time allotment is not met.

4. The system of claim 1, wherein determining the sequential occurrence of each of the plurality of ordered events includes employing a directional preference to improve noise immunity by preferring previous states when both a forward-going condition and a backward-going condition are met.

5. The system of claim 1, wherein the sensor comprises a grid-based infrared sensor, and wherein the series of readings indicative of the person in the observed area includes a heat signature of the person.

6. The system of claim 5, wherein the plurality of ordered events includes a rise or a fall of the heat signature within the associated at least one of the plurality of zones.

7. The system of claim 1, wherein the sensor comprises a temperature sensor, a passive infrared sensor, an active infrared sensor, a laser sensor, a sonic sensor, a Light Detection and Ranging (LIDAR) sensor, an ultrasound sensor, a pressure sensor, or a proximity sensor.

8. The system of claim 1, wherein the sensor is the fixture to which the instruction is provided.

9. The system of claim 1, wherein the sensor is embedded within a light fixture.

10. The system of claim 1, wherein the sensor and the processor are housed within a single fixture.

11. The system of claim 1, wherein the trigger condition includes determining that the person has moved to a particular one of or a group of the plurality of zones.

12. The system of claim 1, wherein the trigger condition includes determining that the person has exited the observed area in a particular direction.

13. The system of claim 1, wherein the trigger condition includes determining or tracking a movement of the person in the observed area.

14. The system of claim 1, wherein the trigger condition includes determining a presence of the person in the observed area.

15. The system of claim 1, wherein the trigger condition includes counting the person in the observed area.

16. The system of claim 1, wherein the sensor is positioned directly over the observed area.

17. The system of claim 1, wherein the sensor is positioned at an angle respective to the observed area.

18. The system of claim 1, wherein the series of readings indicative of the person in the observed area are received wirelessly from the sensor.

19. The system of claim 1, wherein the series of readings indicative of the person in the observed area are received via wired connection from the sensor.

20. The system of claim 1, wherein the instruction is an activation command, and wherein the fixture is a remote indicator or a sign.

21. The system of claim 1, wherein the instruction includes triggering an actuator in the fixture.

22. The system of claim 1, wherein the instruction includes a change to a state or a behavior of the fixture.

23. The system of claim 22, wherein the change to the state includes exiting a low power state.

24. The system of claim 1, wherein the processor is further configured to:
    determine an alert based on the trigger condition; and
    provide the alert to a visual dashboard of a building management solutions (BMS).

25. A computer-implemented method for detecting or following a person within an observed area, the method being executed by a processor and comprising:
    receiving, from a sensor, a series of readings indicative of a person in an observed area, wherein the observed area is divided into a plurality of zones;
    determining a sequential occurrence of each of a plurality of ordered events by applying a detection threshold value to the series of readings, wherein the detection threshold value is lower than a noise threshold of the sensor, wherein each of the plurality of ordered events is associated with at least one of the plurality of zones, and wherein the events are ordered based on a juxtaposition of the plurality of zones;
    determining a trigger condition based on the sequential, collective occurrence of each of the plurality of ordered events within a configured time allotment; and
    providing an instruction to a fixture based on the trigger condition.

26. A non-transitory, computer-readable medium storing instructions that, when executed by an electronic processor, perform a set of operations, the set of operations comprising:
    receiving, from a sensor, a series of readings indicative of a person in an observed area, wherein the observed area is divided into a plurality of zones;

determining a sequential occurrence of each of a plurality of ordered events by applying a detection threshold value to the series of readings, wherein the detection threshold value is lower than a noise threshold of the sensor, wherein each of the plurality of ordered events is associated with at least one of the plurality of zones, and wherein the events are ordered based on a juxtaposition of the plurality of zones; determining a trigger condition based on the sequential, collective occurrence of each of the plurality of ordered events within a configured time allotment; and providing an instruction to a fixture based on the trigger condition.

\* \* \* \* \*